United States Patent
Sugita et al.

(10) Patent No.: US 9,513,753 B2
(45) Date of Patent: Dec. 6, 2016

(54) TOUCH-SENSOR-EMBEDDED DISPLAY PANEL, DISPLAY DEVICE PROVIDED THEREWITH, AND METHOD FOR DRIVING TOUCH-SENSOR-EMBEDDED DISPLAY PANEL

(71) Applicant: Sharp Kabushiki Kaisha, Osaka-shi, Osaka (JP)

(72) Inventors: Yasuhiro Sugita, Osaka (JP); Kazutoshi Kida, Osaka (JP); Kohhei Tanaka, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 117 days.

(21) Appl. No.: 14/366,312

(22) PCT Filed: Dec. 14, 2012

(86) PCT No.: PCT/JP2012/082468
§ 371 (c)(1),
(2) Date: Jun. 18, 2014

(87) PCT Pub. No.: WO2013/094527
PCT Pub. Date: Jun. 27, 2013

(65) Prior Publication Data
US 2014/0327654 A1    Nov. 6, 2014

(30) Foreign Application Priority Data
Dec. 19, 2011    (JP) .................................. 2011-276689

(51) Int. Cl.
*G06F 3/044*    (2006.01)
*G02F 1/1333*    (2006.01)
(Continued)

(52) U.S. Cl.
CPC ........... *G06F 3/044* (2013.01); *G02F 1/13338* (2013.01); *G06F 3/042* (2013.01); *G06F 3/0412* (2013.01); *G09G 3/3648* (2013.01)

(58) Field of Classification Search
None
See application file for complete search history.

(56) References Cited

U.S. PATENT DOCUMENTS

| | | |
|---|---|---|
| 6,452,514 B1 | 9/2002 | Philipp |
| 2010/0001973 A1 | 1/2010 | Hotelling et al. |

(Continued)

FOREIGN PATENT DOCUMENTS

| | | |
|---|---|---|
| JP | 2011-109081 A | 6/2011 |
| JP | 2011-128982 A | 6/2011 |

(Continued)

OTHER PUBLICATIONS

Official Communication issued in International Patent Application No. PCT/JP2012/082468, mailed on Feb. 5, 2013.
(Continued)

*Primary Examiner* — Seokyun Moon
*Assistant Examiner* — Douglas M Wilson
(74) *Attorney, Agent, or Firm* — Keating & Bennett, LLP

(57) ABSTRACT

There is provided a touch-sensor-embedded display panel with reduced decrease in aperture ratio and reduced increase in frame area, with lowered power consumption and improved operation performance.
A driving pixel (21) is constituted by: a thin film transistor (T1); a pixel electrode (Epix1); a driving common electrode (COM1); and a liquid crystal capacitance (Clc1) which is formed between the pixel electrode (Epix1) and the driving common electrode (COM1). A sensing pixel (22) is constituted by a thin film transistor (T2), a pixel electrode (Epix2), a sensing common electrode (COM2), and a liquid crystal capacitance (Clc2) which is formed between the pixel electrode (Epix2) and the sensing common electrode (COM2). Neither the driving pixel (21) nor the sensing pixel (22) include an auxiliary capacitance. The thin film transistors (T1, T2) have their channel layers formed of IGZO.

3 Claims, 16 Drawing Sheets

(51) Int. Cl.
  *G06F 3/041* (2006.01)
  *G06F 3/042* (2006.01)
  *G09G 3/36* (2006.01)

(56) References Cited

U.S. PATENT DOCUMENTS

| | | |
|---|---|---|
| 2010/0060591 A1 | 3/2010 | Yousefpor et al. |
| 2011/0090416 A1 | 4/2011 | Arasawa et al. |
| 2011/0148785 A1 | 6/2011 | Oda et al. |
| 2011/0148806 A1 | 6/2011 | Oda et al. |
| 2011/0153263 A1 | 6/2011 | Oda et al. |
| 2011/0187677 A1* | 8/2011 | Hotelling .............. G06F 3/0412 345/174 |
| 2012/0287093 A1* | 11/2012 | Gotoh .................. G06F 3/0412 345/204 |
| 2015/0137115 A1* | 5/2015 | Moon ............... H01L 21/02422 257/43 |

FOREIGN PATENT DOCUMENTS

| | | | | |
|---|---|---|---|---|
| KR | WO 2011108884 A2 * | 3/2012 | ......... | H01L 31/1884 |
| KR | WO 2011108884 A3 * | 3/2012 | ......... | H01L 31/1884 |

OTHER PUBLICATIONS

Kim et al., "16.1:82 Ultra Definition LCD Using New Driving Scheme and Advanced Super PVA Technology", SID Symposium Digest of Technical Papers, vol. 39, Issue 1, 2008, pp. 196-199.

* cited by examiner (A)

(B)

(C)

TOUCH-SENSOR-EMBEDDED DISPLAY PANEL, DISPLAY DEVICE PROVIDED THEREWITH, AND METHOD FOR DRIVING TOUCH-SENSOR-EMBEDDED DISPLAY PANEL

TECHNICAL FIELD

The present invention relates to touch-sensor-embedded display panels, and more specifically to a display panel incorporating a capacitive touch sensor, a display device provided therewith, and a method for driving the display panel.

BACKGROUND ART

Touch panels have been a focus of attention as an input device in operating computer systems and the like. In a capacitance touch panel for example, a position of a target object such as an operator's finger or a pen is detected on the basis of electrostatic capacitance changes between a driving line and a sensing line. Conventionally, such a touch panel as described is placed on a display panel provided by a liquid crystal display panel for example. The touch panel provided on the display panel as described above is called "out-cell touch panel" for example.

However, out-cell touch panels have problems that they increase overall weight and thickness of the display panel and touch panel, and that they increase power demand for driving the touch panel. Efforts have been made in recent years therefore, in developing a touch-sensor-embedded display panel which is a display panel incorporating a touch panel (or in more precise wording, a display panel with built-in touch sensor functions for a touch panel). A touch panel in such a touch-sensor-embedded display panel as described is called "in-cell touch panel" for example. Touch-sensor-embedded display panels make it possible to decrease overall weight and thickness of the display panel and touch panel, and also decrease drive power for the display panel and touch panel as a whole.

FIG. 18 is an equivalent-circuit diagram of a driving pixel 321 and a sensing pixel 322 in a touch-sensor-embedded liquid crystal display panel disclosed in Patent Document 1. Herein, the driving pixel 321 and the sensing pixel 322 are pixels corresponding to a driving line and a sensing line respectively. The driving pixel 321 is constituted by a transistor T1, a pixel electrode Epix1, two common electrodes COM1, a liquid crystal capacitance Clc1 formed between the pixel electrode Epix1 and one of the common electrodes COM1, and an auxiliary capacitance Cst1 formed between the pixel electrode Epix1 and the other of the common electrodes COM1. As depicted, the driving pixel 321 includes the liquid crystal capacitance Clc1 and the auxiliary capacitance Cst1 as capacitances for holding a voltage which corresponds to a signal (source signal) applied to a source line SL1. The sensing pixel 322 is constituted by a transistor T2, a pixel electrode Epix2, two common electrodes COM2, a liquid crystal capacitance Clc2 formed between the pixel electrode Epix2 and one of the common electrodes COM2, and an auxiliary capacitance Cst2 formed between the pixel electrode Epix2 and the other of the common electrodes COM2. As depicted, the sensing pixel 322 includes the liquid crystal capacitance Clc2 and the auxiliary capacitance Cst2 as capacitances for holding a voltage which corresponds to a signal (source signal) applied to a source line SL2. In FIG. 18, Cf represents a capacitance (hereinafter called "detection capacitance") that changes its capacitance value when approached by a finger tip, pen or the like; whereas Cp1 through Cp4 represents parasitic capacitances.

If this liquid crystal display panel is not an IPS (In-Plane Switching) type (hereinafter called "non-IPS type"), but is an VA (Vertical Alignment) type for example, one of the two common electrodes COM1 is disposed on a CF (Color filter) substrate while the other is disposed on a TFT (Thin Film Transistor) substrate. Likewise, one of the two common electrodes COM2 is disposed on the CF substrate while the other is disposed on the TFT substrate. The common electrodes COM1 and COM2 in the touch-sensor-embedded liquid crystal display panel function as common electrodes in a liquid crystal display device during display operation, whereas they function as a driving line and a sensing line respectively during touch detection operation. In the touch detection operation, the common electrodes COM1, COM2 are driven independently per predetermined region. In the present Description, "display operation" refers to an operation performed for displaying images in a display panel, whereas "touch detection operation" refers to an operation performed for detecting coordinates of a touch position of a finger, for example, in the display panel.

LITERATURE ON CONVENTIONAL ART

Patent Document

Patent Document 1: U.S. Patent Application Laid-Open No. 2010/0001973
Patent Document 2: Japanese Patent Application Laid-Open No. 2011-109081
Patent Document 3: U.S. Pat. No. 6,452,514
Patent Document 4: Japanese Patent Application Laid-Open No. 2011-128982
Patent Document 5: U.S. Patent Application Laid-Open No. 2010/0060591

Non-Patent Document

Non-Patent Document 1: Sang Soo Kim et al., "16.1: 82" Ultra Definition LCD Using New Driving Scheme and Advanced Super PVA Technology" SID Symposium Digest of Technical Papers, Volume 39, Issue 1, pp. 196-199, 2008

SUMMARY OF THE INVENTION

Problems to be Solved by the Invention

Now, according to the touch-sensor-embedded liquid crystal display panel disclosed in Patent Document 1, if the panel is of a non-IPS type, it is necessary to dispose the common electrodes COM1, COM2 in both of the CF substrate and the TFT substrate. Therefore, both of the CF substrate and the TFT substrate must be provided with wiring for driving the common electrodes COM1, COM2 independently for each predetermined region during touch detection operation. This decreases aperture ratio, and in addition, increases frame area. Still additionally, in the case of decreased aperture ratio as described above, back light brightness must be increased in order to provide a predetermined level of display brightness, and this leads to increased power consumption by the back light.

The following mathematical expression (1) gives electric potential change $\Delta$Vpix1 of the pixel electrode Epix1 during touch detection operation in the touch-sensor-embedded liquid crystal display panel disclosed in Patent Document 1.

$$\Delta Vpix1 = \Delta Vcom1 \cdot (Clc1 + Cst1)/Ctot1 \quad (1)$$
$$\approx \Delta Vcom1 \cdot (Clc1 + Cst1)/(Clc1 + Cst1 + Cp1 + Cp3)$$

where, $\Delta Vcom1$ represents an electric potential change (AC component) in the common electrode COM1 whereas Ctot1 represents a total capacitance of capacitances connected to the pixel electrode Epix1. In order to maintain a liquid crystal application voltage which was captured during the display operation, by conducting the electric potential change in a signal which is given to the common electrodes COM1 during the touch detection operation, Clc1+Cst1 must be sufficiently large. For this reason, the auxiliary capacitance Cst1 is set to have a relatively large capacitance value. For the same reason, the auxiliary capacitance Cst2 is set to have a relatively large capacitance value. These, however, increase a load when driving the display panel and therefore increase power consumption. Further, not only the CF substrate side but also the TFT substrate side has a set of the common electrodes COM1, COM2, and this further increases the load on the driving line and the sensing line. This is particularly caused by a load capacitance between the common electrode COM1 and the source line SL1 or a gate line GL1; and a load capacitance between the common electrode COM2 and the source line SL2 or a gate line GL2. This leads to increased power consumption. In an attempt to reduce increase in the power consumption, drive frequency for the display operation and the number of integral operations (periodic number of burst waveform) for the touch detection operation might be decreased; however, this leads to compromised operation performance in the display operation and the touch detection operation.

It is therefore an object of the present invention to provide a touch-sensor-embedded display panel which has a reduced decrease in aperture ratio and reduced increase in frame area, with lowered power consumption and improved operation performance. Another object is to provide a display device provided therewith; and a method for driving the touch-sensor-embedded display panel.

Means for Solving the Problems

A first aspect of the present invention provides a touch-sensor-embedded display panel comprising a plurality of pixel formation portions disposed correspondingly to a plurality of image signal lines and to a plurality of scanning signal lines formed on a first substrate. In this panel, each pixel formation portion includes:

a pixel switching element disposed on the first substrate and having a control terminal connected to a corresponding one of the scanning signal lines;

a pixel electrode disposed on the first substrate and connected to a corresponding one of the image signal lines via the pixel switching element;

common electrodes belonging to a first group or a second group and disposed on a second substrate opposed to the first substrate; and a pixel capacitance formed between the pixel electrode and the common electrode as an only capacitance for holding a voltage which corresponds to a signal applied to the image signal lines. With the above arrangement, the common electrodes belonging to the first group provide a plurality of driving lines which are driven by driving signals during a touch detection operation whereas the common electrodes belonging to the second group provide a plurality of sensing lines crossing the driving lines, for receiving a signal responsive to the driving signal during the touch detection operation.

A second aspect of the present invention provides the first aspect of the present invention, wherein the pixel switching element is provided by a thin film transistor which has its channel layer formed of an oxide semiconductor.

A third aspect of the present invention provides the second aspect of the present invention, wherein the oxide semiconductor contains indium, gallium, zinc and oxygen as primary ingredients.

A fourth aspect of the present invention provides the first aspect of the present invention, wherein the liquid crystal display panel is of a non-IPS type.

A fifth aspect of the present invention provides the fourth aspect of the present invention, wherein the liquid crystal display panel is of a VA type.

A sixth aspect of the present invention provides any one of the first to the fifth aspects of the present invention, wherein each driving line is formed by an array of generally rectangular driving segments provided by part of the common electrodes belonging to the first group, arranged in a first direction and electrically connected to each other, whereas each sensing line is formed by an array of generally rectangular sensing segments provided by part of the common electrodes belonging to the second group, arranged in a second direction and electrically connected to each other.

A seventh aspect of the present invention provides the sixth aspect of the present invention, wherein the driving segments which provide each driving line or the sensing segments which provide each sensing line are electrically connected to each other via a wiring provided near an edge of the second substrate.

An eighth aspect of the present invention provides any one of the first to the fifth aspect of the present invention, wherein each driving line is formed by an array of substantially diamond-shaped driving segments provided by part of the common electrodes belonging to the first group, arranged in a first direction and electrically connected to each other, whereas each sensing line is formed by an array of substantially diamond-shaped sensing segments provided by part of the common electrodes belonging to the second group, arranged in a second direction and electrically connected to each other.

A ninth aspect of the present invention provides the eighth aspect of the present invention, wherein mutually adjacent ones of the driving segments which provide each driving line, or mutually adjacent ones of the sensing segments which provide each sensing line are electrically connected to each other via a wiring which is provided in a layer different from a layer provided with the driving segment and the sensing segment.

A tenth aspect of the present invention provides any one of the first to the fifth aspects of the present invention, wherein each pixel formation portion includes:

a first sub-pixel formation portion which includes the pixel switching element, the pixel electrode, the common electrode and the pixel capacitance; and a second sub-pixel formation portion which includes the pixel switching element, the pixel electrode, the common electrode, the pixel capacitance, a variation switching element having a control terminal connected to a scanning signal line which immediately follows the scanning signal line that corresponds to the pixel; and a variation capacitance. With the arrangement described above, the variation switching element is between the pixel electrode and one end of the variation capacitance, and the variation capacitance has the other end connected to an electrode which is provided with a predetermined fixed electric potential at least during the display operation.

An eleventh aspect of the present invention provides the tenth aspect of the present invention, wherein the variation switching element is provided by a thin film transistor which has a channel layer formed of an oxide semiconductor.

A twelfth aspect of the present invention provides the eleventh aspect of the present invention, wherein the oxide semiconductor contains indium, gallium, zinc and oxygen as primary ingredients.

A thirteenth aspect of the present invention provides a display device which includes:

a touch-sensor-embedded display panel according to any one of the first to twelfth aspects of the present invention;

a display control unit for controlling the pixel formation portions during a display operation; and a touch detection control unit for controlling the pixel formation portions during a touch detection operation.

A fourteenth aspect of the present invention provides the thirteenth aspect of the present invention, wherein the touch detection control unit drives a predetermined number not smaller than two of the driving lines simultaneously.

A fifteenth aspect of the present invention provides a method for driving a touch-sensor-embedded display panel which includes a plurality of pixel formation portions disposed correspondingly to a plurality of image signal lines and a plurality of scanning signal lines formed on a first substrate. The method includes:

a step of driving a plurality of driving lines which are provided by common electrodes belonging to a first group and formed on a second substrate which is opposed to the first substrate, by means of driving signal during a touch detection operation; and a step of receiving a signal responsive to the driving signal from a plurality of sensing lines which cross the driving lines and are provided by common electrodes belonging to a second group and formed on the second substrate, during the touch detection operation. In this method, each pixel formation portion includes:

a pixel switching element disposed on the first substrate and having its control terminal connected to a corresponding one of the scanning signal lines;

a pixel electrode disposed on the first substrate and connected to a corresponding one of the image signal lines via the pixel switching element;

the common electrodes; and a pixel capacitance formed between the pixel electrode and the common electrode as an only capacitance for holding a voltage which corresponds to a signal applied to the image signal lines.

A sixteenth aspect of the present invention provides the fifteenth aspect of the present invention, wherein a predetermined number not smaller than two of the driving lines are simultaneously driven in the step of driving the driving lines.

Advantages of the Invention

According to the first or the fifteenth aspect of the present embodiment, there is adopted a configuration that only a liquid crystal capacitance is formed as a capacitance for holding a voltage which corresponds to a source signal applied to the image signal line. This eliminates auxiliary capacitances. Therefore, it is no longer necessary for the first substrate which is provided by a TFT substrate for example, to be formed with common electrodes and various other wiring to be connected thererto that are otherwise necessary to form the auxiliary capacitances. This makes it possible to reduce decrease in aperture ratio and to decrease increase in frame area. Also, in a display device which uses a back light, it is now possible to reduce increase in power consumption by the back light since decrease in the aperture ratio is now reduced and therefore it is no longer necessary to set a back light brightness to a higher level in order to ensure a predetermined level of display brightness. Further, the arrangement reduces load at the time of driving the display panel since no use is made for auxiliary capacitances which generally require relatively high level of capacitance value settings, and since the common electrodes are not provided on the first substrate side which is provided by, e.g., a TFT substrate, but are provided only on the second substrate side which is provided by, e.g., a CF substrate. This makes it possible to reduce power consumption. Also, with such a level of saving in power consumption, it is no longer necessary to provide such power saving means as decreasing drive frequency during the display operation, and decreasing the number of integration operations (decreasing the periodic number of burst waveform) performed during the touch detection operation. In other words, it becomes possible to reduce performance decrease in the display operation, and performance decrease in the touch detection operation as well. It should be noted here that the term "capacitance for holding a voltage which corresponds to a signal applied to the image signal line" does not include any parasitic capacitances.

According to the second aspect of the present invention, the pixel switching element, which is provided by a thin film transistor, has its channel layer formed of an oxide semiconductor. Because of this, off-leakage current is far smaller than in cases where a silicon thin film transistor (i.e., thin film transistor which utilizes e.g. amorphous silicon for its channel layer) is used. Thus, it is possible to sufficiently reduce variation in the liquid crystal application voltage even if there is no auxiliary capacitance formed in each pixel.

According to the third aspect of the present invention, the same advantages are provided as offered by the second aspect of the present invention by the use of an oxide semiconductor which contains indium, gallium, zinc and oxygen as main ingredients, i.e., IGZO.

According to the fourth aspect of the present invention, the same advantages are provided as offered by the first aspect of the present invention, in non-IPS type liquid crystal display panels.

According to the fifth aspect of the present invention, the same advantages are provided as offered by the first aspect of the present invention by using a VA type liquid crystal display panel as a non-IPS type liquid crystal display panel.

According to the sixth aspect of the present invention, it is possible to form the driving lines from the generally rectangular driving segments arranged in the first direction, and to form sensing lines from the generally rectangular sensing segments arranged in the second direction.

According to the seventh aspect of the present invention, the driving segments or the sensing segments are electrically connected to each other via wiring which is provided near an edge of the second substrate. Therefore, it is not necessary to provide an extra connecting layer for these connections. This makes it possible to decrease a thickness of the display panel. Also, since the connection layer is no longer necessary, the arrangement reduces process cost while improving product yield.

According to the eighth aspect of the present invention, it is possible to form the driving lines from the generally diamond-shaped driving segments arranged in the first direction, and to form sensing lines from the generally diamond-shaped sensing segments arranged in the second direction.

According to the ninth aspect of the present invention, mutually adjacent driving segments or mutually adjacent sensing segments are connected to each other via wiring which is provided in a different layer from the layer which is formed with the driving segments and the sensing segments Therefore, it is not necessary to provide extra wiring for such connections. This reduces the number of wiring in the second substrate, making it possible to further reduce the increase in the frame area.

According to the tenth aspect of the present invention, in a multiple pixel structure in which each pixel formation portion is divided into the first sub-pixel formation portion and the second sub-pixel formation portion, the second sub-pixel formation portion is provided with a variation switching element and a variation capacitance. This makes it possible, without providing additional image signal lines, to make a liquid crystal application voltage difference between the first sub-pixel formation portion and the second sub-pixel formation portion. This eliminates visual-angle dependency of gamma characteristic while reducing increase in the number of source lines and power consumption to drive the source lines.

According to the eleventh aspect of the present invention, the variation switching element, which is provided by a thin film transistor, has its channel layer formed of an oxide semiconductor. Therefore, ON current is larger than in cases where a silicon thin film transistor is used. Consequently, there is a relatively large charge amount moving from the pixel capacitance to the variation capacitance via the variation switching element when the variation switching element is turned ON. Therefore, it is possible to ensure a sufficient liquid crystal application voltage difference between the first sub-pixel formation portion and the second sub-pixel formation portion.

According to the twelfth aspect of the present invention, the same advantages are provided as offered by the eleventh aspect of the present invention by the use of an oxide semiconductor which contains indium, gallium, zinc and oxygen as main ingredients, i.e., IGZO.

According to the thirteenth aspect of the present invention, the same advantages are obtained as offered by one of the first through the twelfth aspects of the present invention, in the display device.

According to the fourteenth aspect of the present invention, use of so-called parallel driving type makes it possible to decreases burden (decrease in image quality, high power consumption, etc.) in the display operation, or to improve touch detection operation performance.

MODE FOR CARRYING OUT THE INVENTION

Hereinafter, a first through a third embodiments of the present invention will be described with reference to the attached drawings. It should be appreciated that in the present Description the term "line" simply refers to an electricity-conducting path, and is not limited to linear structures.

<1. First Embodiment>
<1.1 Overall Configuration and Operation Outline>

Figure 1:
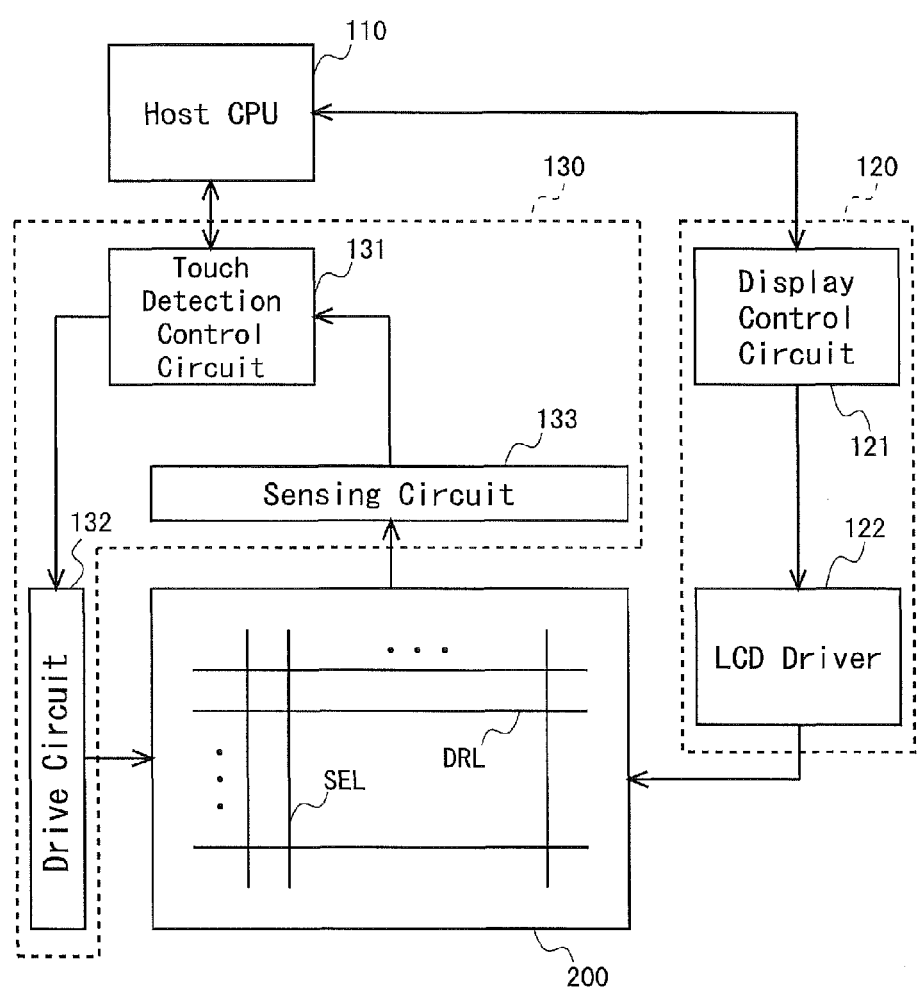
FIG. 1 is a block diagram which shows an overall configuration of a liquid crystal display device according to a first embodiment of the present invention.

FIG. 1 is a block diagram which shows an overall configuration of a liquid crystal display device according to a first embodiment of the present invention. This liquid crystal display device not only has image display functions as a liquid crystal display device but also has touch sensor functions. As shown in FIG. 1, the present liquid crystal display device includes: a host CPU 110, a display control unit 120, a touch detection control unit 130, and a touch-sensor-embedded liquid crystal display panel 200 (hereinafter simply called "display panel 200"). The display control unit 120 includes a display control circuit 121 and an LCD driver 122. The touch detection control unit 130 includes a touch detection control circuit 131, a drive circuit 132 and a sensing circuit 133. Though not illustrated in the figure, there is a back light provided behind the display panel 200.

In the display panel 200, a plurality of driving lines DRL and a plurality of sensing lines SEL are disposed to cross each other. The driving lines DRL are formed by electrically connecting a plurality of common electrodes COM provided on a CF substrate of the display panel 200, to each other. Hereinafter, a common electrode COM which forms a driving line DRL will be called "driving common electrode" and will be indicated by an alpha-numerical symbol "COM1". The sensing lines SEL are formed by electrically connecting a plurality of common electrodes COM which are not the driving common electrodes COM1. Hereinafter, a common electrode which forms a sensing line SEL will be called "sensing common electrode" and will be indicated by an alpha-numerical symbol "COM2". Between the driving line DRL and the sensing line SEL, there is formed a detection capacitance Cf which varies its capacitance value depending on the degree of proximity from a target object such as a finger. As described, the display panel 200 incorporates therein a touch sensor (touch panel) of a mutual capacitance type. The display panel 200 further includes a plurality of source lines (image signal lines) SL and a plurality of gate lines (scanning signal lines) GL disposed to cross each other; however, these lines are not illustrated for the sake of expedience. Details of the display panel 200 will be described later.

The host CPU 110 controls the display control circuit 121 and the touch detection control circuit 131. The display control circuit 121 controls the LCD driver 122 based on the control provided by the host CPU 110. The LCD driver 122 drives the display panel 200 for performing display operation, based on the control provided by the display control circuit 121. As described, display operation in the display panel 200 is implemented by the display control circuit 121 and the LCD driver 122 which are included in the display control unit 120. The touch detection control circuit 131 controls the drive circuit 132 based on the control provided by the host CPU 110. The drive circuit 132 controls the driving lines DRL based on the control provided by the touch detection control circuit 131. The sensing circuit 133 generates a sensing signal which represents a voltage indicating a charge amount that moves from the driving line DRL to the sensing line SEL, and sends the signal to the touch detection control circuit 131. Based on the sensing signal received, the touch detection control circuit 131 detects presence/absence of a touch, and obtains coordinates of the target object. Then, the touch detection control circuit 131 sends information about the coordinates of the target object to the host CPU 110. Thereafter, depending on the arrangement, the host CPU 110 may control the display control circuit 121 to perform a display operation in response to the touch. As described, touch detection operation in the display panel 200 is implemented by the touch detection control circuit 131, the drive circuit 132 and the sensing circuit 133 which are included in the touch control unit 130.

<1.2 Display Panel Configuration>

Figure 2:
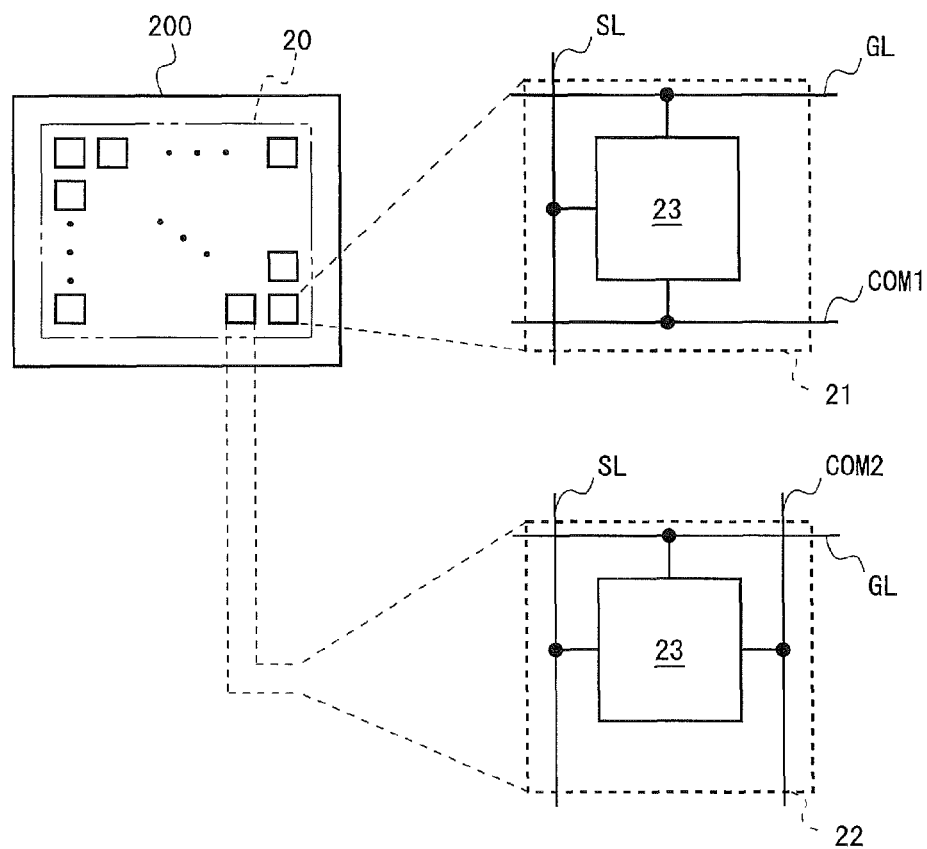
FIG. 2 is a diagram which shows a general pixel configuration in a display panel in the first embodiment.

FIG. 2 is a diagram which shows a general pixel configuration in the display panel 200 in the present embodiment. The display panel 200 is a liquid crystal display panel of a non-IPS type, and more specifically a VA type liquid crystal display panel. The display panel 200 includes a display section 20 which is constituted by a plurality of pixel formation portions (hereinafter simply called "pixels") disposed in a matrix pattern correspondingly to the source lines SL and the gate lines GL. The pixel in the present embodiment implements both display function for display operation and touch detection function for touch detection operation. Regarding the display function, all pixels are classified into one kind. Regarding the touch detection function, however, they are classified into two kinds. Specifically, the touch detection function is classified into two kinds, i.e., one related to a function associated with the driving line DRL and the other related to a function associated with the sensing line SEL. In this specification document, when description will be made with a focus on the touch detection function, those pixels which implement the function associated with the driving lines DRL will be called "driving pixels." Also, those pixels which implement the function associated with the sensing lines SEL will be called "sensing pixel."

As shown in FIG. 2, each pixel contains a circuit element group 23 constituted by a plurality of circuit elements. Constituent elements of the circuit element group 23 are the same in all pixels regardless of whether a pixel is a driving pixel or a sensing pixel. In a driving pixel 21, the circuit element group 23 is connected to a driving common electrode COM1, and to a source line SL and a gate line GL as well. In a sensing pixel 22, the circuit element group 23 is connected to a sensing common electrode COM2, and to a source line SL and a gate line GL as well. Although details will be described later, each pixel is actually constituted by a plurality of sub-pixels each corresponding to one of the source lines SL. In other words, each sub-pixel includes the circuit element group 23. For the sake of expedience, however, description hereinafter may occasionally be made on a premise that one pixel includes one circuit element group 23.

Figure 3:
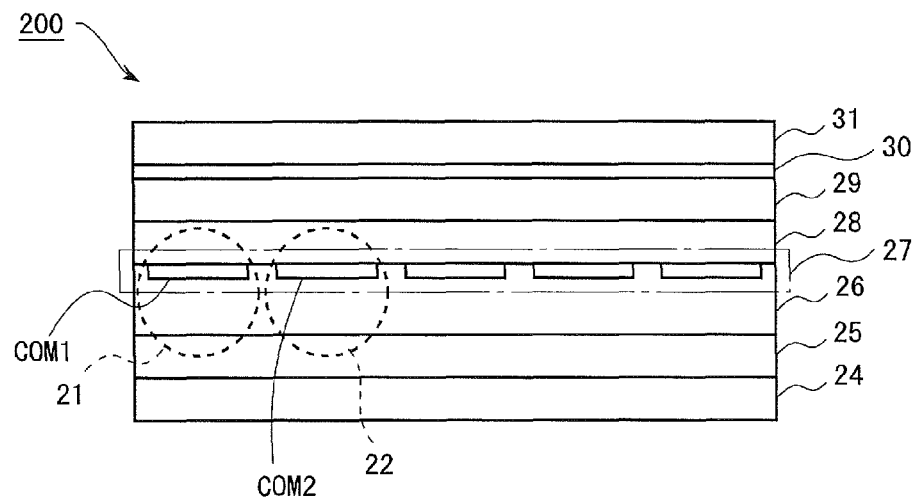
FIG. 3 is a sectional view of the display panel according to the first embodiment.

FIG. 3 is a sectional view of the display panel 200 according to the present embodiment. Note that the figure does not show those constituent elements which are not relevant to the touch detection function. As shown in FIG. 3, the display panel 200 has a laminated structure, constituted by, naming from the bottom side in the drawing: a polarization plate 24, a TFT substrate 25, a liquid crystal layer 26, a CF substrate 28, a polarization plate 29, an adhesive 30, and a cover glass 31. The CF substrate 28 has a side opposed to the liquid crystal layer 26, on which there is formed a common electrode group 27 constituted by a plurality of common electrodes COM. It should be noted here that the driving common electrode COM1 shown in FIG. 3 is actually constituted by a plurality of driving common electrodes COM1 which are electrically connected to each other. Likewise, the sensing common electrode COM2 in FIG. 3 is actually constituted by a plurality of sensing common electrodes COM2 which are electrically connected to each other. The driving common electrodes COM1 which are electrically connected to each other, the electrodes on the TFT substrate 25 which are opposed to the driving common electrodes COM1, and the liquid crystal layer 26 sandwiched between the driving common electrodes COM1 and the electrodes on the TFT substrate 25 form a plurality of driving pixels 21 (illustrated as one in FIG. 3 for the sake of expedience). Likewise, the sensing common electrodes COM2 which are electrically connected to each other, electrodes on the TFT substrate 25 which are opposed to the sensing common electrodes COM2, and the liquid crystal layer 26 sandwiched between the sensing common electrodes COM2 and the electrodes on the TFT substrate 25 form a plurality of sensing pixels 22 (illustrated as one in FIG. 3 for the sake of expedience).

<1.3 Pixel Layout>

Figure 4:
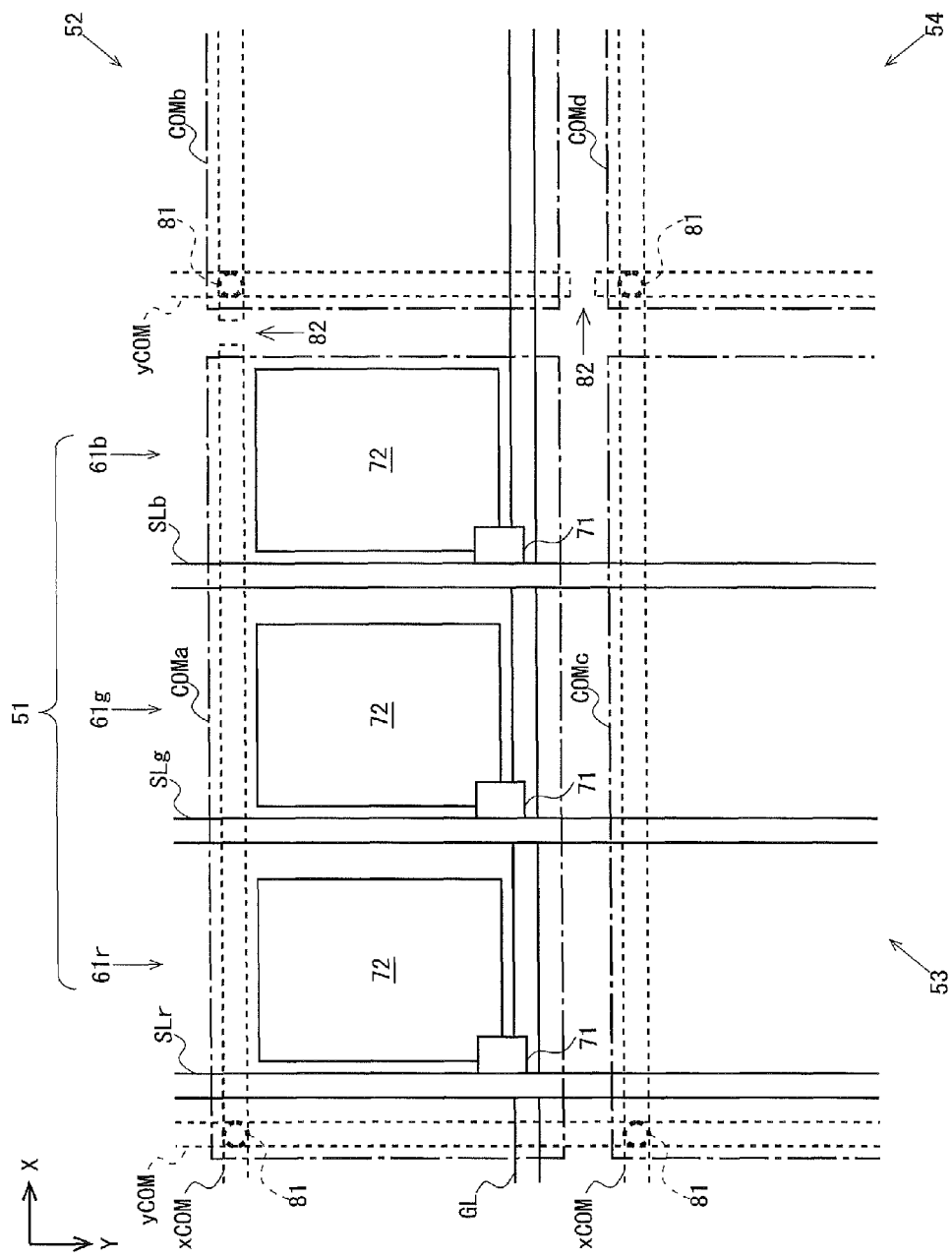
FIG. 4 is a diagram which shows a pixel layout in the first embodiment.

FIG. 4 is a diagram which shows a pixel layout in the present embodiment. FIG. 4 uses solid lines to show those constituent elements provided on the TFT substrate 25 side, whereas those constituent elements provided on the CF substrate 28 side are shown in broken lines or in alternate long and short dash lines. As shown in FIG. 4, each pixel 51 is constituted by three sub-pixels 61r, 61g, 61b corresponding to red (R), green (G), and blue (B) respectively. Hereinafter, these three sub-pixels 61r, 61g, 61b will be called "R sub-pixel", "G sub-pixel", and "B sub-pixel" respectively. It should be noted here that types of the sub-pixels are not limited to these. For example, there may be a sub-pixel corresponding to yellow (Y). In FIG. 4, three source lines SL corresponding to R, G, B are differentiated by respective symbols "SLr", "SLg" and "SLb". Hereinafter, these three source lines SLr, SLg, SLb will be called "R source line", "G source line" and "B source line" respectively.

In a pixel 51, each sub-pixel includes a thin film transistor 71 as a switching element, a pixel electrode 72 and a common electrode COMa. The symbol "COMa" indicates a common electrode COM which corresponds to the pixel 51. The pixel electrode 72 and the common electrode COM are formed of ITO (Indium Tin Oxide). The thin film transistor 71 has its channel layer formed of IGZO (InGaZnOx). IGZO provides advantages, which will be described later. The common electrode COMa is common to the R sub-pixel 61r, the G sub-pixel 61g and the B sub-pixel 61b which constitute the pixel 51. In other words, in the present embodiment, one pixel has one common electrode COM. In each sub-pixel, a liquid crystal capacitance Clc as a pixel capacitance is formed by the pixel electrode 72, the common electrode COMa, and the liquid crystal layer 26 sandwiched therebetween. In each sub-pixel, the thin film transistor 71 has a control terminal provided by its gate terminal, which is connected to a gate line GL, while a drain terminal is connected to the pixel electrode 72. In the R sub-pixel 61r, the thin film transistor 71 has its source terminal connected to the R source line SLr. In the G sub-pixel 61g, the thin film transistor 71 has its source terminal connected to the G source line SLg. In the B sub-pixel 61b, the thin film transistor 71 has its source terminal connected to the B source line SLb. Pixels 52, 53, 54 in FIG. 4 have the same configuration as the pixel 51, so the description will not be repeated. FIG. 4 uses symbols "COMb", "COMc" and "COMd", which indicate common electrodes COM corresponding to the pixels 52, 53, 54 respectively.

As described above, a plurality of common electrodes COM are electrically connected to each other, to form the driving line DRL or the sensing line SEL. The electrical connection described above is achieved by using a plurality of X-direction connection lines xCOM and Y-direction connection lines yCOM disposed to cross each other on the CF substrate 28 side. In the present embodiment, X direction is a direction in which the gate lines GL and the driving lines DRL extend, whereas Y direction is a direction in which the source lines SL and the sensing lines SEL extend. The X direction and the Y direction correspond to the first direction and the second direction respectively. Setting of the X direction and the Y direction is only an example, and therefore is not of a limiting nature.

As shown in FIG. 4, each common electrode COM is connected to an X-direction connection line xCOM and a Y-direction connection line yCOM via a connecting section 81. Since the common electrodes COMa, COMc are connected to the same Y-direction connection line yCOM, they are electrically connected to each other. Also, since the common electrodes COMc, COMd are connected to the same X-direction connection line xCOM, they are electrically connected to each other. Specifically, the common electrodes COMa, COMc, COMd are electrically connected to each other. Hereinafter, common electrodes connected to each other electrically as described above may be called "region". Further, a region which forms a driving line DRL will be called "driving region", and a region which forms a sensing line SEL will be called "sensing region". In other words, the driving common electrode COM1 described above belongs to a driving region (which corresponds to the first group), whereas the sensing common electrode COM2 described above belongs to a sensing region (which corresponds to the second group).

Although the common electrodes COMa, COMb are connected to the same X-direction connection line xCOM, a break 82 is provided between two connecting sections 81 which correspond to the respective common electrodes COMa, COMb. This makes the common electrodes COMa, COMb not electrically connected to each other (excluding, however, cases where the common electrodes COMa, COMb are electrically connected to each other via other X-direction connection line xCOM and Y-direction connection line yCOM). Likewise, although the common electrodes COMb, COMd are connected to the same Y-direction connection line yCOM, a break 82 is provided between two connecting sections 81 which correspond to the respective common electrodes COMb, COMd. This makes the common electrodes COMb, COMd not electrically connected to each other (excluding, however, cases where the common electrodes COMb, COMd are electrically connected to each other via other X-direction connection line xCOM and Y-direction connection line yCOM). Thus, the common electrodes COMa, COMc and COMd, and the common electrode COMb form regions which are different from each other. As described thus far, in the present embodiment, driving regions and sensing regions are formed by using the X-direction connection lines xCOM, the Y-direction connection lines yCOM, the connecting sections 81 and the breaks 82.

Figure 5:
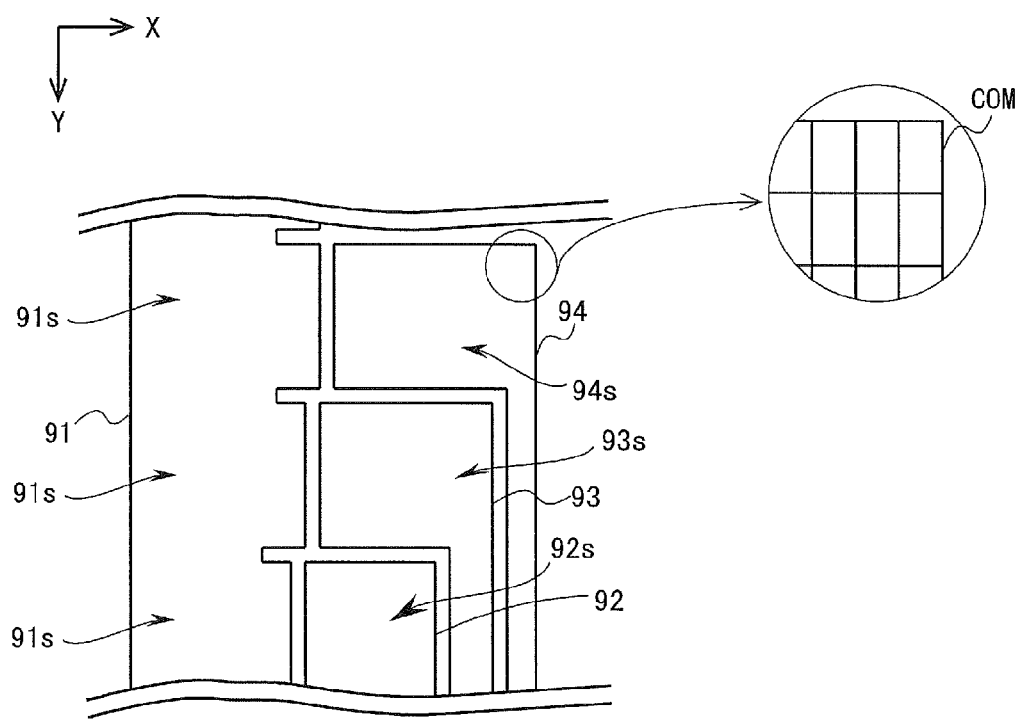
FIG. 5 is a diagram which shows a configuration example of a driving region and a sensing region in the first embodiment.

FIG. 5 shows a configuration example of the driving region and the sensing region in the present embodiment. The figure shows one sensing region 91 and part of three driving regions 92, 93, 94. Each region is formed by electrically connecting a plurality of common electrodes COM as described above. The sensing region 91 includes a plurality of generally rectangular regions 91s. The generally rectangular regions 91s are arranged in an array in the Y direction. In the present embodiment, these generally rectangular regions 91s will be called "sensing segments". Each of the driving regions 92, 93, 94 includes generally rectangular regions 92s, 93s, 94s. In the present embodiment, each of the generally rectangular regions 92s, 93s, 94s will be called "driving segment". Each driving region has a non-driving-segment region (a region extending in the Y direction, and hereinafter called "connection extension area"), which is provided for establishing a connection for that driving region with other driving regions which have driving segments in the X direction, via wiring in the CF substrate 28 to be described later. A driving segment and a sensing segment which are mutually adjacent to each other form the detection capacitance Cf described earlier. It should be noted here that in an actual situation, there can be another capacitance (of a smaller capacitance value than the detection capacitance Cf) between the sensing segment and the connection extension area, but description therefor will not be made here.

Figure 6:
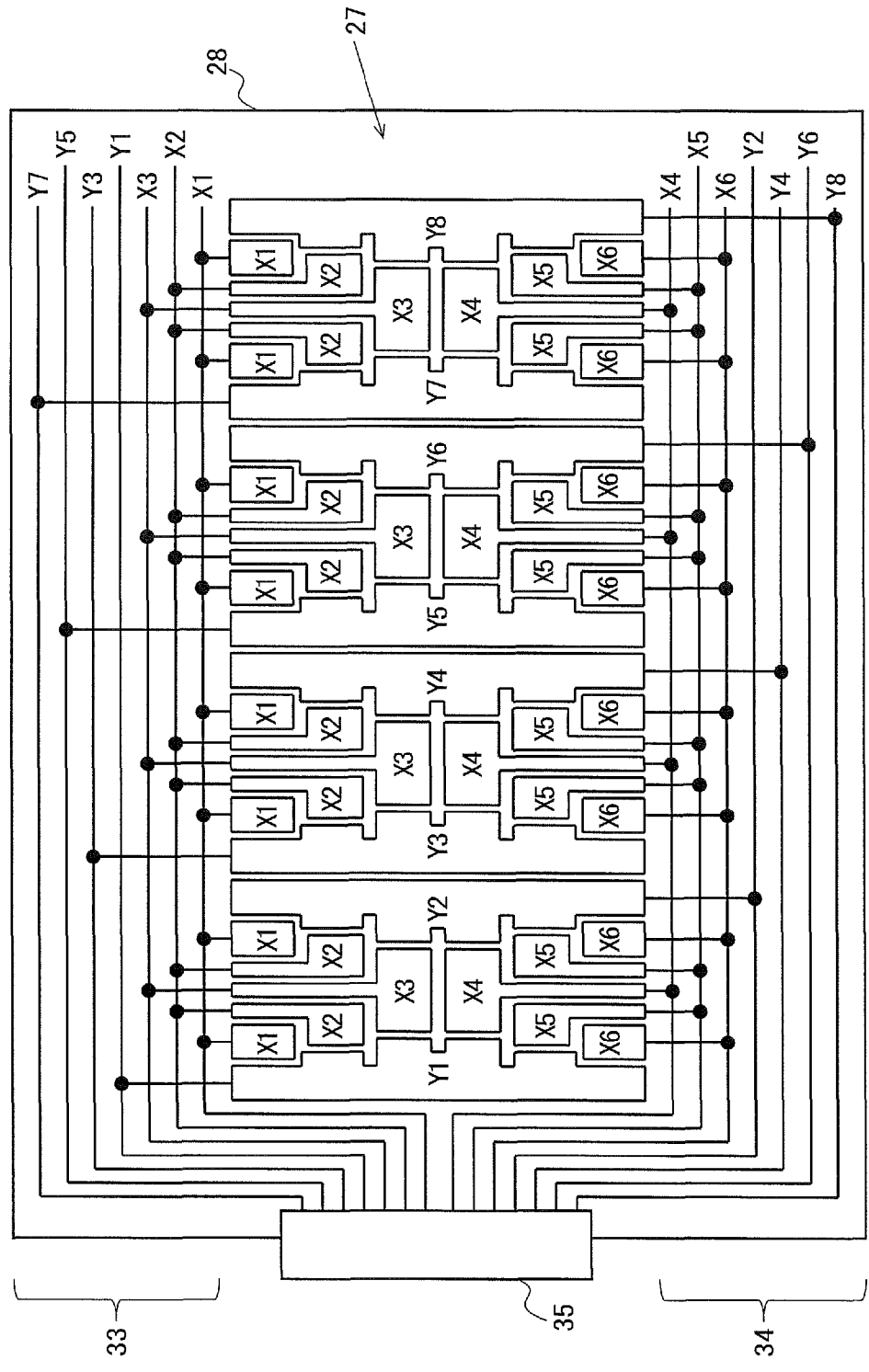
FIG. 6 is a diagram which shows a common-electrode pattern in a CF substrate in the first embodiment.

FIG. 6 is a diagram which shows a common-electrode pattern on the CF substrate 28 in the present embodiment. As shown in FIG. 6, the common electrode group 27 is constituted by six rows of driving regions X1 through X6 and eight columns of sensing regions Y1 through Y8. Note, however, that the quantity of rows and columns in the present embodiment are only for an example, and any numbers may be used for the number of rows and the number of columns as well, in practical situation. On an upper side (upper side in FIG. 6) of the CF substrate 28, there is a portion near the edge which is not occupied by the common electrode group 27 (hereinafter, this portion will be called "first wiring area" and will be indicated by a reference symbol "33"), Correspondingly to the driving regions X1 through X3 and the sensing regions Y1, Y3, Y5, Y7, this area is provided with seven wires (hereinafter, these seven wires will also be indicated by the reference symbols "X1 through X3, Y1, Y3, Y5 and Y7"). On a lower side (lower side in FIG. 6) of the CF substrate 28, there is a portion near the edge which is not occupied by the common electrode group 27 (hereinafter, this portion will be called "second wiring area" and will be indicated by a reference symbol "34"), Correspondingly to the sensing regions X4 through X6 and the sensing regions Y2, Y4, Y6, Y8, this area is provided with seven wires (hereinafter, these seven wires will also be indicated by the reference symbols "X4 through X6, Y2, Y4, Y6 and Y8"). The wires X1 through X6 and Y1 through Y8 are connected to the drive circuit 132 and the sensing circuit 133 respectively via a flexible print substrate 35.

The eight driving regions X1 are electrically connected to each other via the wire X1. These eight driving regions X1 constitute a single-span portion of the driving line DRL corresponding to the driving region X1. In essence, the driving line DRL is formed by driving segments in the eight driving regions X1 which are electrically connected to each other, i.e., by an array of eight driving segments arranged in the X direction. This also applies to driving lines DRL which are formed by other driving regions. Although there are four driving regions X3, it is possible to regard from FIG. 6 that each single driving region X3 is practically divided in the X direction into two driving regions X3. Likewise, although there are four driving regions X4, it is possible to regard that each single driving region X4 is practically divided in the X direction into two driving regions X4.

As shown in FIG. 6, the driving electrodes X1, X2, X5, X6 and one sensing electrode are disposed in a symmetrical pattern with respect to the X direction, with the driving electrodes X3, X4 being the center of symmetry. Also, with a border between the driving electrodes X3 and X4 being the center, the driving electrodes X1 through X3 are symmetrical with X4 through X6, with respect to the Y direction. Specifically, the driving electrodes X1 through X3 are disposed in an inversed pyramid pattern, whereas the driving electrodes X4 through X6 are disposed in a pyramid pattern. With the above, the sensing segments have incrementally larger areas as they are closer to the center in the Y direction. Such a layout as described enables to set an appropriate area balance between mutually adjacent driving segments, and the sensing segments as well, even if each driving region is provided with the connection extension area. This makes it possible to increase touch detection accuracy since it reduces a problem that the detection capacitance Cf, which is formed between the driving segment and the sensing segment, does not have a uniform capacitance value depending upon the position.

The same pattern of formation is applied for formation of the other single-span portions of the driving line DRL than the driving region X1. Specifically, a single-span portion of the driving line DRL for the driving region X2 is formed by mutual electrical connection of eight driving regions X2 connected via the wiring X2. A single-span portion of the driving line DRL for the driving electrodes X3 is formed by mutual electrical connection of virtually eight driving electrodes X3 connected via the wiring X3. A single-span portion of the driving line DRL for the driving electrodes X3 is formed by mutual electrical connection of virtually eight driving electrodes X4 connected via the wiring X4. A single-span portion of the driving line DRL for the driving region X5 is formed by mutual electrical connection of eight driving regions X5 connected via the wiring X5. A single-span portion of the driving line DRL for the driving region X6 is formed by mutual electrical connection of eight driving regions X6 connected via the wiring X6. Each sensing line SEL is formed by mutual electrical connection of six sensing segments in each sensing region. As described above, the sensing regions need no connections between sensing segments via wiring in the first wiring area 33 or in the second wiring area 34. As has been described thus far, in the CF substrate 28, a plurality of driving lines DRL and a plurality of sensing lines SEL are arranged to virtually cross each other.

However, the above example in the present embodiment is not of a limiting nature. For example, the driving lines DRL may be formed like the sensing lines SEL in the present embodiment, with the sensing lines SEL being formed like the driving lines DRL in the present embodiment. In other words, the driving line DRL may be formed by electrically connecting a plurality of driving segments to each other without via the wiring in the first wiring area 33 or the second wiring area 34, and the sensing line SEL may be formed by electrically connecting a plurality of sensing segment to each other via wiring in the first wiring area 33 or in the second wiring area 34.

<1.4 Equivalent Circuit>

Figure 7:
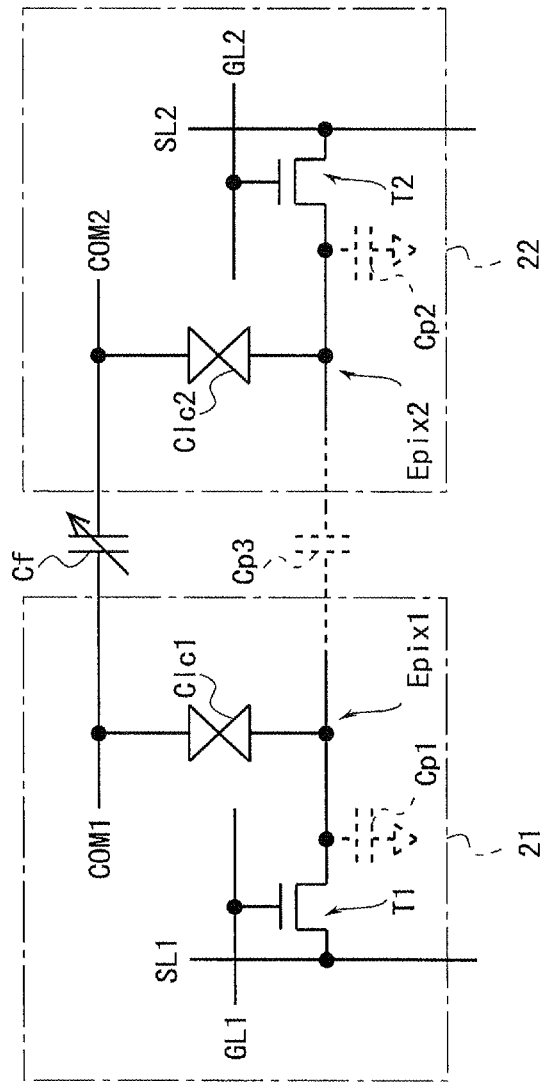
FIG. 7 is an equivalent-circuit diagram of a driving pixel and a sensing pixel in the first embodiment.

FIG. 7 is an equivalent-circuit diagram of the driving pixel 21 and the sensing pixel 22 in the present embodiment. Each of the driving pixel 21 and the sensing pixel 22 is constituted by three sub-pixels. For the sake of expedience, however, they will be explained as constituted by one sub-pixel. Also, although a touch detection operation is performed between a plurality of the driving pixels 21 and a plurality of sensing pixels 22, description herein will be made on a premise that the operation is performed between one driving pixel 21 and one sensing pixel 22, for the sake of expedience.

The driving pixel 21 is disposed correspondingly to an intersection made by a source line SL1 and a gate line GL1. The driving pixel 21 is constituted by a thin film transistor T1; a pixel electrode Epix1; a driving common electrode COM1; and a liquid crystal capacitance Clc1 formed as a pixel capacitance between the pixel electrode Epix1 and the driving common electrodes COM1. In the driving pixel 21, the thin film transistor T1 and the pixel capacitance/liquid crystal capacitance Clc1 constitute the circuit element group 23 described earlier. Unlike the driving pixel 321 in Patent Document 1, the driving pixel 21 in the present embodiment does not include the driving common electrode COM1 on the TFT substrate 25 side, nor the auxiliary capacitance Cst1 formed between the driving common electrode COM1 and the pixel electrode Epix1. Specifically, the driving pixel 21 includes only the liquid crystal capacitance Clc1 as a capacitance for holding a voltage which corresponds to a source signal applied to the source line SL1. It should be noted here that the term "capacitance for holding a voltage which corresponds to a source signal applied to the source line SL1" does not include any parasitic capacitances. The thin film transistor T1 has its gate terminal connected to the corresponding gate line GL1. The pixel electrode Epix1 is connected to the corresponding source line SL1 via the thin film transistor T1. In the driving pixel 21, it is assumed that parasitic capacitance Cp1 are formed between the pixel electrode Epix1 and a predetermined electrode, etc.

The sensing pixel 22 is disposed correspondingly to an intersection made by a source line SL2 and a gate line GL2. It should be noted here that there can be a case where the source lines SL1 and SL2 are the same as each other, or the gate lines GL1 and GL2 are the same as each other. The sensing pixel 22 is constituted by a thin film transistor T2; a pixel electrode Epix2; a sensing common electrode COM2; and a liquid crystal capacitance Clc2 formed as a pixel capacitance between the pixel electrode Epix2 and the sensing common electrodes COM2. In the sensing pixel 22, the thin film transistor T2 and the liquid crystal capacitance Clc2 constitute the circuit element group 23 described earlier. Unlike the sensing pixel 322 in Patent Document 1, the sensing pixel 22 in the present embodiment does not include the sensing common electrode COM2 on the TFT substrate 25 side, nor the auxiliary capacitance Cst2 formed between the sensing common electrode COM2 and the pixel electrode Epix2. Specifically, the sensing pixel 22 includes only the liquid crystal capacitance Clc2 as a capacitance for holding a voltage which corresponds to a source signal applied to the source line SL2. It should be noted here that the term "capacitance for holding a voltage which corresponds to a source signal applied to the source line SL2" does not include any parasitic capacitance. The thin film transistor T2 has its gate terminal connected to the corresponding gate line GL2. The pixel electrode Epix2 is connected to the corresponding source line SL2 via the thin film transistor T2. In the sensing pixel 22, it is assumed that parasitic capacitances Cp1 are formed between the pixel electrode Epix2 and a predetermined electrode, etc.

Between the driving common electrode COM1 and the sensing common electrodes COM2, there is formed a detection capacitance Cf which changes its capacitance value when approached by a target object. Between the pixel electrode Epix1 of the driving pixel 21 and the pixel electrode Epix2 of sensing pixel 22, a parasitic capacitance Cp3 is formed. Hereinafter, capacitance values of the liquid crystal capacitances Clc1, Clc2, the detection capacitance Cf, and the parasitic capacitances Cp1 through Cp3 may also be indicated by the symbols "Clc1, Clc2, Cf, and Cp1 through Cp3" respectively.

<1.5 Operation>

Figure 8:
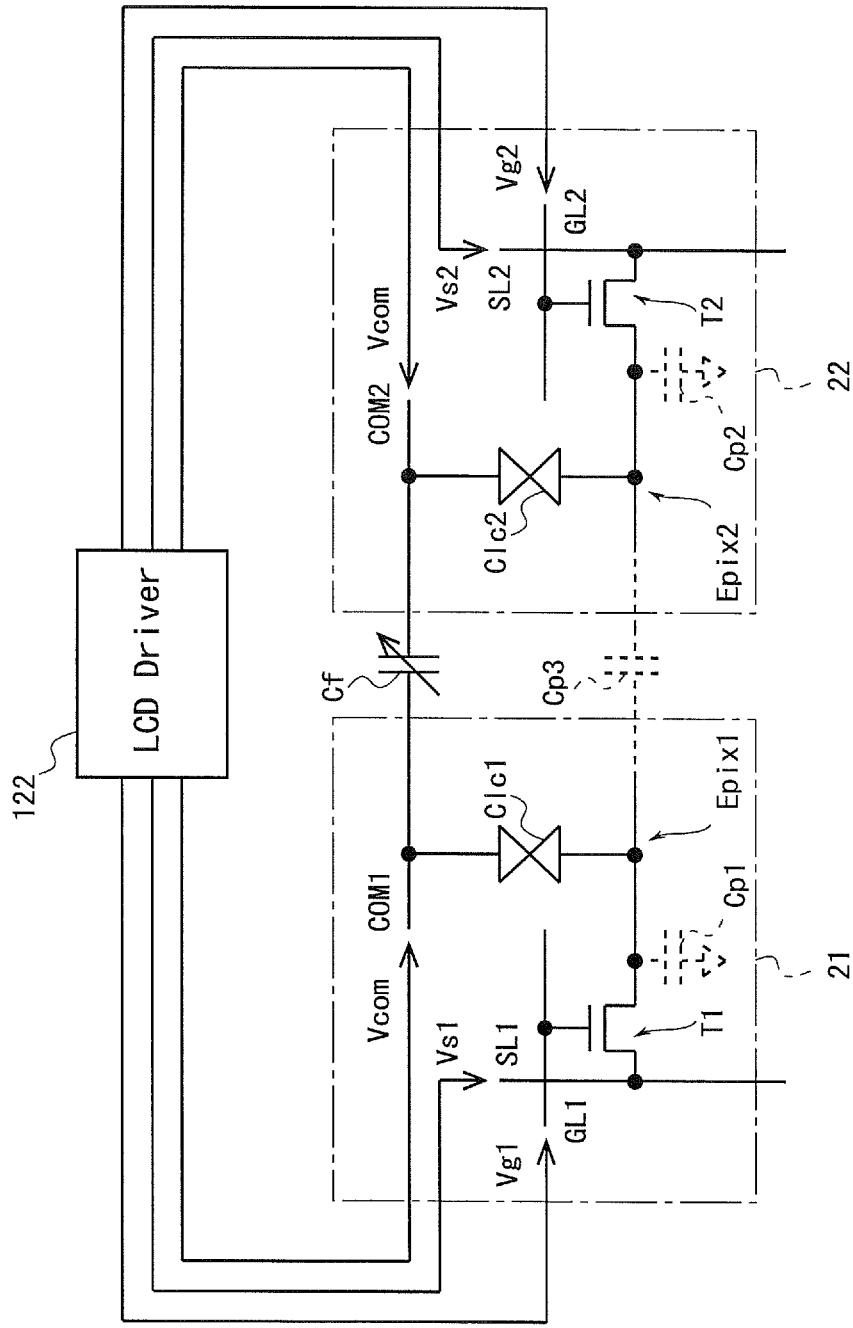
FIG. 8 is a diagram for describing a circuit operation in a display operation according to the first embodiment.
Figure 9:
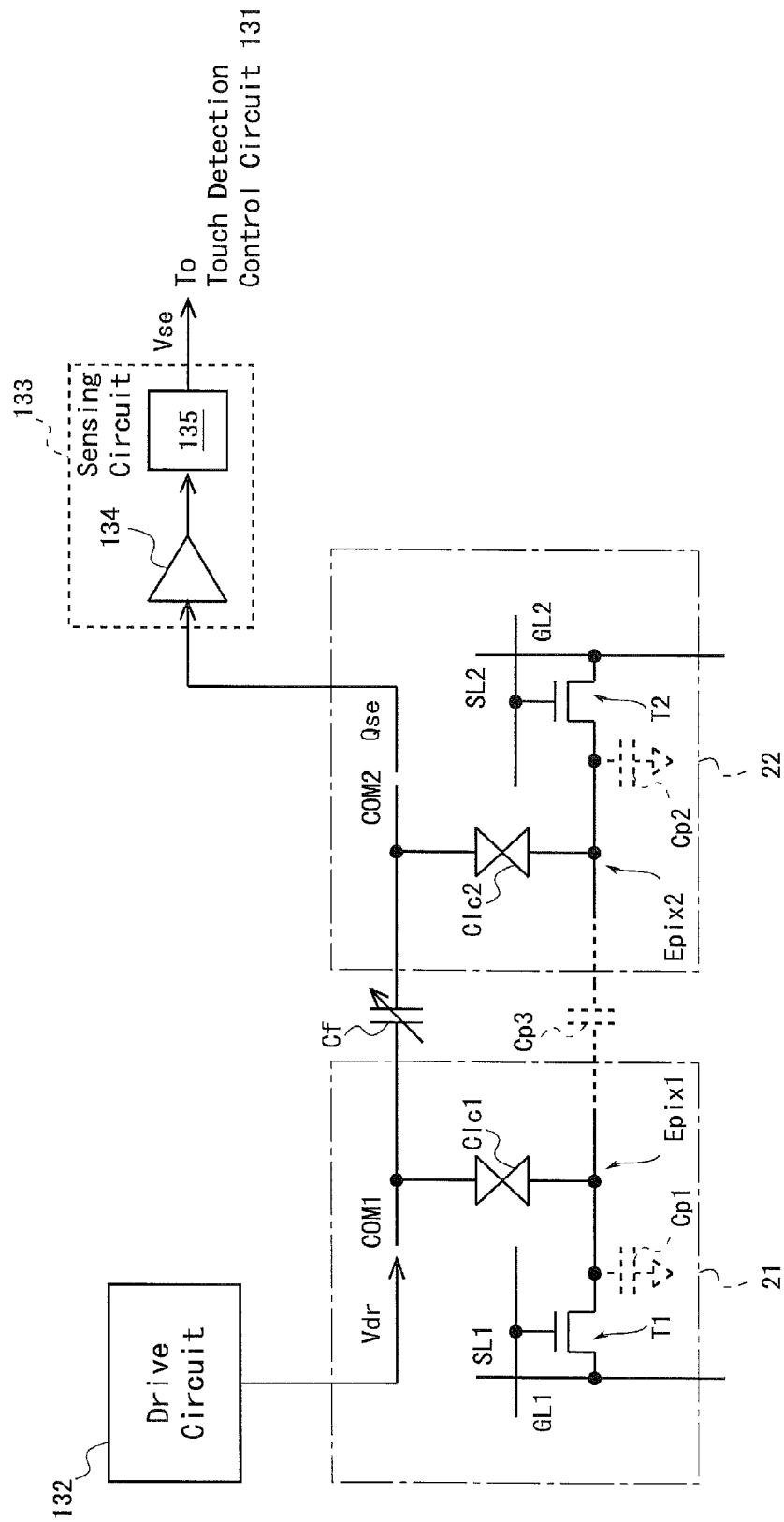
FIG. 9 is a diagram for describing a circuit operation in a touch detection operation according to the first embodiment.
Figure 10:
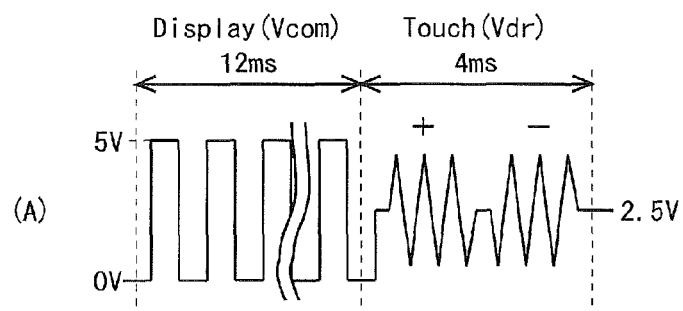
FIG. 10(A) is a signal waveform chart which shows a driving line electric potential in the first embodiment.
FIG. 10(B) is a signal waveform chart which shows a sensing line electric potential in the first embodiment.
Figure 10:
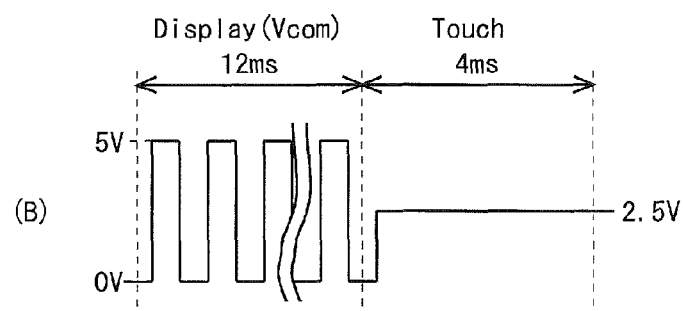

FIG. 8 is a diagram for describing a circuit operation in a display operation in the present embodiment. FIG. 9 is a diagram for describing a circuit operation in a touch detection operation in the present embodiment. FIG. 10(A) is a signal waveform chart which shows an operation of the driving common electrode in the present embodiment. FIG. 10(B) is a signal waveform chart which shows an operation of the sensing common electrode COM2 in the present embodiment. It should be noted here that the display operation, the operation during the touch detection period, and electric potentials (V) of the driving common electrode COM1 and the sensing common electrode COM2 used in the following description are only for examples, and the present invention is not limited thereby. In the present embodiment, a display operation which is performed for a period of 12 ms is alternated with a touch detection operation which is performed for a period of 4 ms. Also, though not illustrated, a predetermined set of switches change connections of the driving common electrode COM1 and the sensing common electrode COM2 from the display operation to the touch detection operation and vice versa.

Figure 11:
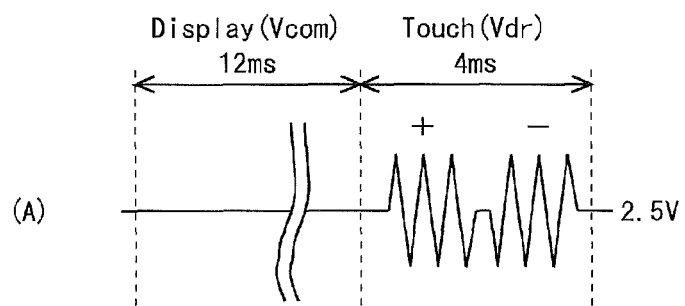
FIG. 11(A) is a signal waveform chart which shows a driving line electric potential in the first embodiment.
FIG. 11(B) is a signal waveform chart which shows a sensing line electric potential in the first embodiment.
Figure 11:
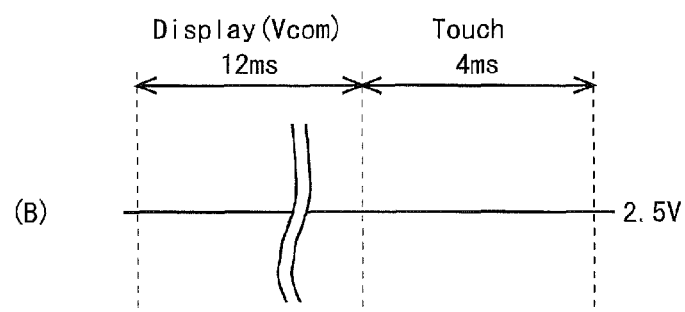

First, the display operation will be described. During the display operation, both the driving common electrode COM1 and the sensing common electrode COM2 are connected to the LCD driver 122. As shown in FIG. 8, the LCD driver 122 applies a signal to each source line, gate line, and common electrode. More specifically, the LCD driver 122 applies a source signal Vs1, a gate signal Vg1, and a common signal Vcom respectively to the source line SL1, the gate line GL1, and the driving common electrode COM1, for the driving pixel 21; and a source signal Vs2, a gate signal Vg2, and a common electrode Vcom respectively to the source line SL2, the gate line GL2, and the sensing common electrode COM2, for the sensing pixel 22. As shown in FIG. 10(A), FIG. 10(B), during the display operation, both the driving pixel 21 and the sensing pixel 22 are given the same common signal Vcom as each other. In the display operation, so called counter AC driving is performed in which AC driving is performed to the common electrode COM. In the counter AC driving, the common signal Vcom is a 2.5V±2.5V square wave signal for example. However, the present invention is not limited by this. For example, as shown in FIG. 11(A), FIG. 11(B), the common electrode COM may receive DC driving, i.e., so called counter DC driving may be utilized. In counter DC driving, the common signal Vcom is kept at 2.5V.

In the driving pixel 21, the thin film transistor T1 is turned ON in response to an active gate signal Vg1, and an electric charge representing the source signal Vs1 is captured in the liquid crystal capacitance Clc1. The captured electric charge is maintained substantially as it is, even after the gate signal Vg1 has been de-activated. This will be elaborated later. As a result of the process described above, a voltage which represents an image to be displayed is applied to the place between the pixel electrode Epix1 and the driving common electrodes COM1 (i.e., to the liquid crystal layer). Likewise, in the sensing pixel 22, the thin film transistor T2 is turned ON in response to an active gate signal Vg2, and an electric charge representing the source signal Vs2 is captured in the liquid crystal capacitance Clc2. As a result of this process, a voltage which represents an image to be displayed is applied to the place between the pixel electrode Epix2 and the sensing common electrode COM2. Hereinafter, a period for which the thin film transistor is in ON state will be called "ON period", whereas a period for which it is in OFF state will be called "OFF period".

In cases where a silicon thin film transistor (i.e., a thin film transistor which utilizes e.g. amorphous silicon for a channel layer), the thin film transistor has a relatively large off-leakage current (electric current which flows during the OFF period). This causes the electric charge which is held in the liquid crystal capacitance to leak via the thin film transistor, and consequently alters a voltage applied to the liquid crystal layer (hereinafter called "liquid crystal application voltage"). This results in such a problem as flickering. In an attempt to solve this problem, an auxiliary capacitance is provided in the touch-sensor-embedded liquid crystal display panel which is disclosed in Patent Document 1 or in other conventional display panels. The auxiliary capacitance makes it possible to hold a larger charge amount, and therefore to reduce influence from the off-leakage current. However, such an auxiliary capacitance is not utilized in the present embodiment. On the contrary, in the present embodiment, the thin film transistors T1, T2 have their channel layers formed of IGZO. Those thin film transistors which make use of an oxide semiconductor such as IGZO in their channel layers have much smaller (in fact, smaller by several digits) off-leakage current than the silicon thin film transistors. Therefore, it is possible, without an auxiliary capacitance, to sufficiently reduce the alteration of the liquid crystal application voltage. Such a configuration, i.e., use of a thin film transistor which includes an oxide semiconductor in its channel layer, and non-use of the auxiliary capacitance is disclosed in Patent Document 2 for example. Since the present embodiment does not make use of auxiliary capacitance, there is no need for auxiliary capacitance formation electrodes (common electrodes COM1, COM2 on the TFT substrate side in Patent Document 1). Specifically, in the present embodiment, the TFT substrate 25 is not formed with the common electrodes or their relevant wiring connected thereto which are formed on the TFT substrate disclosed in Patent Document 1.

Next, the touch detection operation will be described. During the touch detection operation, the driving common electrode COM1 is connected to the drive circuit 132 whereas the sensing common electrodes COM2 is connected to the sensing circuit 133. It should be noted here that in the touch detection operation, too, the gate lines GL1, GL2 are given non-active gate signals Vg1, Vg2 respectively. Also, for example, the source lines SL1, SL2 are respectively given source signals Vs1, Vs2, each being a signal of a fixed electric potential. The touch detection operation according to the present embodiment uses so called charge-transfer method which makes use of burst signals. The charge-transfer method is disclosed in Patent Document 3, for example. The present invention is not limited by this, however. For example, any other method may be adopted for the touch detection operation method.

As shown in FIG. 9, during the touch detection operation, the drive circuit 132 applies a driving signal Vdr to the driving common electrode COM1. Specifically, as shown in FIG. 10(A), the driving common electrode COM1 is drivable by using a burst signal of a 15 through 20 cycles, for a period in which the sensing common electrode COM2 is kept at an AC-driving center electric potential (2.5V) by the sensing circuit 133 (see FIG. 10(B)). More specifically, the driving signal Vdr is constituted by two kinds of 2.5V±2V triangular waves each having the same frequency as each other but having an inversed phase from each other (indicated by "+" and "−" symbols in FIG. 10(A)). The triangular wave may be substituted by square wave, sine wave, etc.

Figure 12:
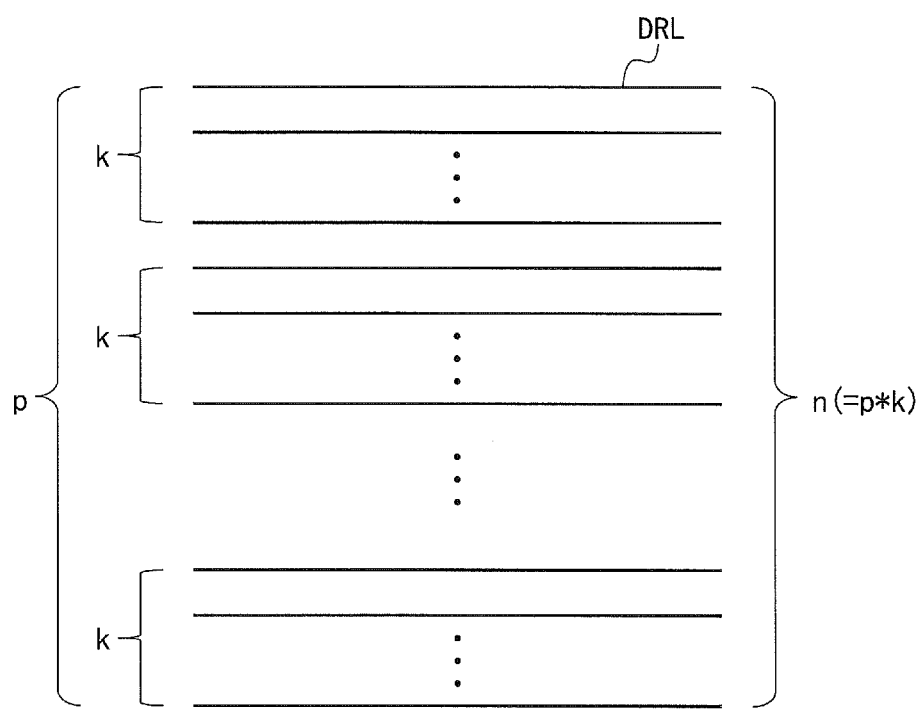
FIG. 12 shows an example of how driving lines can be grouped when a parallel driving method is utilized in the first embodiment.

In the present embodiment, the drive circuit 132 can, for example, select the driving lines DRL shown in FIG. 1 one by one, and apply the driving signal Vdr to the selected driving line DRL. Such a driving method is called "sequential driving method" for example, and is utilized also in the inventions disclosed in Patent Documents 1 and 3. However, the present invention is not limited by this. For example, the drive circuit 132 can select a plurality of the driving lines DRL shown in FIG. 1 at each time, and apply the driving signal Vdr simultaneously to all of the selected driving lines DRL. Such a driving method is called "parallel driving method" for example, and is disclosed in Patent Documents 4, 5, etc. There are many types in the parallel driving method. In one type of the parallel driving method as shown in FIG. 12 for example, a total number of driving lines DRL is n (n is an integer not smaller than 2), and these lines are classified into as many as p groups each including k driving lines DRL. Then, the drive circuit 132 drives the i-th (i=1 through k) driving line DRL in each group simultaneously in all of the p groups. In this method, n=k×p. It should be noted here that the parallel driving method described hereabove is only an example, and it is obvious that many other types are usable.

The application of the driving signal Vdr induces an electric charge in the driving common electrode COM1, and the electric charge moves to the sensing common electrode COM2. Hereinafter, the electric charge which has moved from the driving common electrode COM1 to the sensing common electrode COM2 as described above will be called "sensing electric charge". The sensing electric charge is fed to an electric charge booster 134 in the sensing circuit 133, and then converted by a voltage conversion circuit 135 into a measurable voltage (hereinafter called "sensing voltage" and will be indicated by a reference symbol "Vse"). The sensing voltage Vse is fed to the touch detection control circuit 131. It should be noted here that actually, the sensing circuit 133 includes the electric charge booster 134 and the voltage conversion circuit 135 for each of the sensing lines SEL but they are not illustrated in the drawing. Also, the sensing circuit 133 includes various other constituent elements (such as those necessary for keeping the sensing common electrode COM2 at the AC-driving center electric potential), in addition to the electric charge booster 134 and the voltage conversion circuit 135.

The sensing voltage Vse has its value influenced by the target object's degree of proximity to the driving common electrode COM1 and the sensing common electrode COM2. Specifically, as the target object comes closer to the driving common electrode COM1 and the sensing common electrode COM2, the capacitance value of the detection capacitance Cf becomes smaller, and the amount of sensing electric charge becomes smaller. In other words, when the target object comes closer, a relatively larger amount of electric charge moves from the driving common electrode COM1 toward the target object, making the amount of sensing electric charge relatively small. Therefore, in a case where a target object is in proximity to the driving common electrode COM1 and the sensing common electrode COM2, the sensing voltage Vse is relatively small, whereas the sensing voltage Vse is relatively large when not in proximity thereto. Based upon this, the touch detection control circuit 131 determines, for example, that a target object is in contact with the panel if the sensing voltage Vse has a smaller value than a predetermined threshold value, but determines that a target object is not in contact with the panel if the value is greater than the threshold value. In cases where the sequential driving method is used, one sensing voltage Vse is obtained per one driving line DRL and one sensing line SEL, and therefore, the touch detection control circuit 131 can calculate coordinates of the target object's touch position accurately by scanning the driving lines DRL. Also, in cases where the parallel driving method is employed, for example, a plurality of driving lines DRL which are driven simultaneously are respectively given driving signals Vdr each having a unique spread code from each other, or signals each modulated correspondingly to one of these spread codes. With this arrangement, correlation calculation is performed for the spread code and the sensing voltage Vse, to obtain a correlation value, and then a position having a greater correlation value than a predetermined threshold value is selected as the touch position. The above procedure in the parallel driving method gives accurately calculated coordinates of the touch position like in the sequential driving method. The touch position coordinates calculation method for parallel driving method as described here is disclosed in Patent Document 4 for example. The present invention is not limited by this, however, and it is possible to choose a coordinates detection method from a large variety, for example.

Description will now cover how the touch detection operation influences the state of display. Hereinafter, electric potentials of the pixel electrodes Epix1, Epix2 will be called "pixel electric potentials Vpix1, Vpix2" respectively. As described above, a burst waveform (AC waveform) is applied to the driving common electrode COM1 during the touch detection operation. The electric potential variation ΔVpix1 in the pixel electric potential Vpix1 at this occasion is given by the following mathematical expression (2):

$$\Delta Vpix1 = \Delta Vcom1 \cdot Clc1 / Ctot1 \quad (2)$$

$$\approx \Delta Vcom1 \cdot (Clc1 + Cst1)/(Clc1 + Cst1 + Cp1 + Cp3)$$

where, ΔVcom1 represents an electric potential variation (i.e., AC component of the driving signal Vdr) in the common electrode COM1, whereas Ctot1 represents a total capacitance value of capacitances which are connected to the pixel electrode Epix1. The liquid crystal capacitance Cl1c1 has a much greater capacitance value than those of the parasitic capacitances Cpl, Cp3 and therefore, the AC component of the driving signal Vdr in the form of the 2.5V±2V triangular wave is passed, almost in its entirety, to the pixel electrode Epix1. For this reason, as far as the driving pixel 21 is concerned, it is possible, during the touch detection operation, to keep substantially the same liquid crystal application voltage as the liquid crystal application voltage which was captured during the display operation. During the touch detection operation, there is yet another electric potential change in the sensing common electrode COM2 due to the move of the electric charge from the driving common electrode COM1. The electric potential variation ΔVpix2 in the pixel electric potential Vpix2 at this occasion is given by the following mathematical expression (3):

$$\Delta Vpix2 = \Delta Vcom2 \cdot Clc2 / Ctot2 \quad (3)$$

$$\approx \Delta Vcom2 \cdot Clc2 / (Clc2 + Cp2 + Cp3)$$

where, ΔVcom2 represents an electric potential change in the sensing common electrode COM2, whereas Ctot2 represents a total capacitance value of capacitances connected to the pixel electrode Epix2. The liquid crystal capacitance Clc2 has a much greater capacitance value than those of the parasitic capacitances Cp2, Cp3 and therefore, the electric potential change ΔVcom2 in the sensing common electrode COM2 is passed, almost in its entirety, to the pixel electrode Epix2. For this reason, also for the sensing pixel 22, it is possible, like the driving pixel 21, to keep substantially the same liquid crystal application voltage as the liquid crystal application voltage which was captured during the display operation. As described, since the liquid crystal capacitances Clc1, Clc2 have sufficiently large capacitance values, it is possible, while the touch detection operation is going on, to sufficiently reduce variation in the liquid crystal application voltage which was captured during the display operation.

<1.6 Advantages>

According to the present embodiment, a VA type touch-sensor-embedded display panel uses a configuration in each pixel, that only the liquid crystal capacitance Clc is provided as a capacitance for holding a voltage which corresponds to a source signal. This eliminates auxiliary capacitances. Consequently, there is no longer necessary for the TFT substrate 25 to be formed with common electrodes and various other wiring to be connected thererto which are otherwise necessary to form the auxiliary capacitances. This makes it possible to reduce decrease in aperture ratio and to decrease increase in frame area. Also, it is now possible to reduce increase in power consumption for the back light since decrease in the aperture ratio is now small and therefore there no longer is necessary to set aback light brightness to a higher level in order to ensure a predetermined level of display brightness. Further, the arrangement reduces load at the time of driving the display panel since no use is made for auxiliary capacitances which generally require relatively high level of capacitance value settings, and since the driving common electrodes COM1 and the sensing common electrodes COM2 are not provided on the TFT substrate 25 side but only on the CF substrate 28 side. This makes it possible to reduce power consumption. Also, with such a level of saving in power consumption, it is no longer necessary to provide such power saving means as decreasing drive frequency during the display operation, and decreasing the number of integration operations (decreasing the periodic number of burst waveform) performed during the touch detection operation. In other words, it becomes possible to reduce performance decrease in the display operation, and performance decrease in the touch detection operation as well.

According to the present embodiment, the thin film transistor in each pixel has its channel layer formed of IGZO. Therefore, off-leakage current is much smaller than in cases where a silicon thin film transistor is used. Consequently, it is now possible, without creating an auxiliary capacitance in each pixel, to sufficiently reduce variation in the liquid crystal application voltage. It should be noted here that the same advantage is obtainable not only from IGZO but also from other oxide semiconductors.

According to the present embodiment, on the CF substrate 28, the driving electrodes X1 through X3 are disposed in an inversed pyramid pattern, whereas the driving electrodes X4 through X6 are disposed in a pyramid pattern. With the above, the sensing segments have incrementally larger areas as they are closer to the center in the Y direction. Such a layout as described enables to set an appropriate area balance between mutually adjacent driving segments and all sensing segments as well, even if each driving region is provided with the connection extension area. This makes it possible to increase touch detection accuracy since it reduces a problem that the detection capacitance Cf, which is formed between the driving segment and the sensing segment, does not have a uniform capacitance value depending upon the position. Also, mutual connection between the driving electrodes is achieved by using wiring provided in the first wiring area 33 and the second wiring area 34 of the CF substrate 28. This makes it possible to form both of the driving lines DRL and the sensing lines SEL in the same layer without providing an extra connection layer for such connections. This makes it possible to decrease a thickness of the display panel 200. Also, since the connection layer is no longer necessary, the arrangement reduces process cost while improving product yield.

Further, in cases where parallel driving method is employed in the present embodiment, it becomes possible to shorten the touch detection period than in cases where sequential driving method is employed, with the number of integration operations performed during the touch detection operation being unchanged. This eliminates the need for high-speed writing of the display operation, and therefore reduces burden (decrease in image quality, high power consumption, etc.) in the display operation. As another option, the touch detection period may be as long as in the case where sequential driving method is used. In this case, it becomes possible to perform integration operation more frequently, making it possible to increase performance in the touch detection operation.

<2. Second Embodiment>
<2.1 Common-Electrode Pattern>

Figure 13:
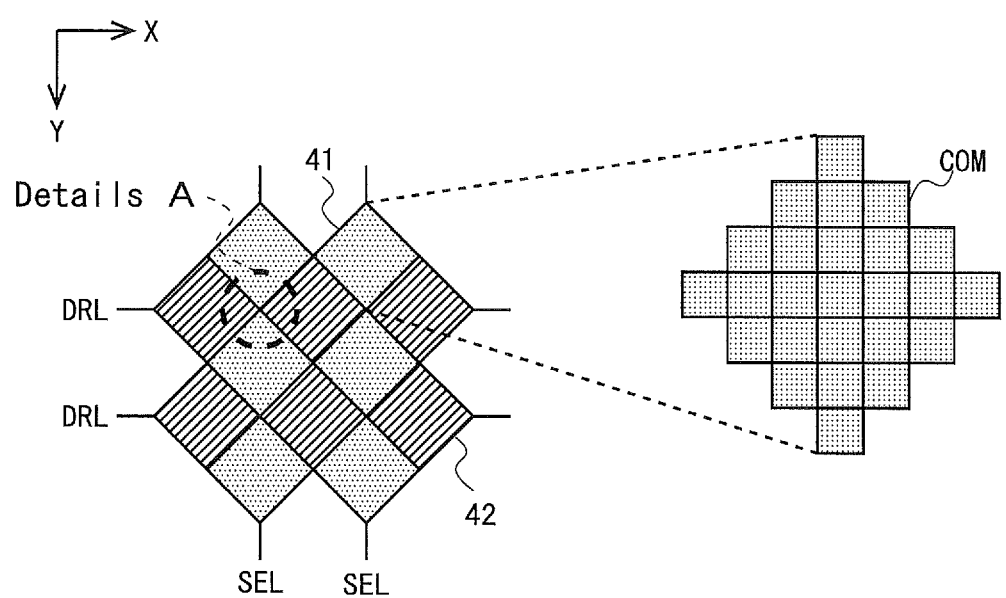
FIG. 13 is a diagram which shows part of a common-electrode pattern in a CF substrate in a second embodiment of the present invention.

FIG. 13 is a diagram which shows part of a common-electrode pattern on a CF substrate 28 according to a second embodiment of the present invention. The present embodiment basically share the configuration and other arrangements with the first embodiment except for the common-electrode pattern, so description for those common aspects will not be repeated. As shown in FIG. 13, in the present embodiment, a plurality of substantially diamond-shaped regions 41 arranged in a Y direction are electrically connected to each other to provide sensing lines SEL. In the present embodiment, these substantially diamond-shaped regions 41 which form the sensing lines SEL will be called "sensing segment". Also, a plurality of substantially diamond-shaped regions 42 arranged in an X direction are electrically connected to each other to provide driving lines DRL. In the present embodiment, these diamond-shaped regions 42 which form the driving lines DRL will be called "driving segments". A plurality of common electrodes COM, which form a diamond shape as a whole, are electrically connected to each other to form the sensing segments 41. FIG. 13 shows a case where a sensing segment 41 is constituted by twenty-five common electrodes COM. However, this is only an example. The present invention is not limited by this. The same applies to the driving segments. The sensing segments 41 and the driving segments 42 are formed in the same layer.

Figure 14:
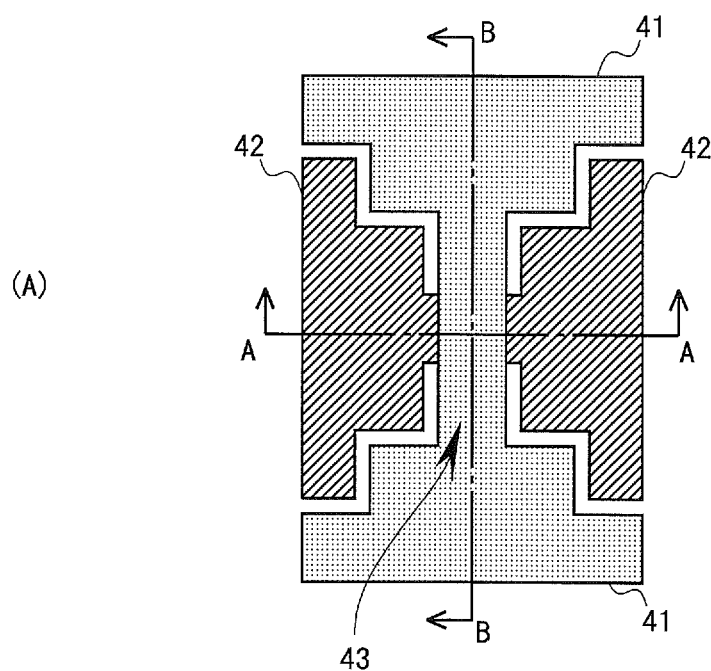
FIG. 14(A) is a plan view which shows an enlarged view of a portion covered by Details A in FIG. 13.
FIG. 14(B) is a sectional view taken in lines A-A in FIG. 14(A).
FIG. 14(C) is a sectional view taken in lines B-B in FIG. 14(A).
Figure 14:
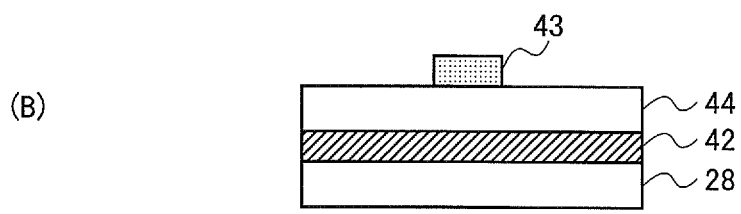
Figure 14:
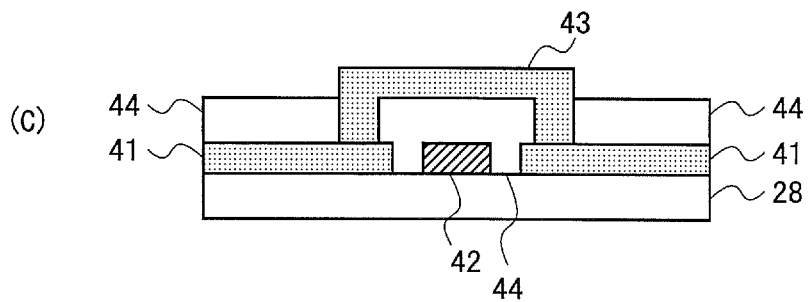

FIG. 14(A) is a plan view which shows an enlarged view of a portion covered by Details A in FIG. 13. FIG. 14(B) is a sectional view taken in lines A-A in FIG. 14(A). FIG. 14(C) is a sectional view taken in lines B-B in FIG. 14(A). As shown in FIG. 14(B) and FIG. 14(C), sensing segments 41 and driving segments 42 on the CF substrate 28 are covered by an insulation layer 44. As shown in FIG. 14(A) and FIG. 14(B), the driving segments 42 are connected to each other with the same material (ITO) in the same layer (the connection provided by ITO is also indicated by the reference symbol "42"). On the contrary, as shown in FIG. 14(A) through FIG. 14(C), the sensing segments 41 are connected to each other via a bridge section 43 which is formed as wiring on an insulation layer 44. The bridge section 43 may be made of ITO as is the sensing segment 41, or may be made of another metal. The above is how the driving electrodes DRL and the sensing electrodes SEL are arranged. It should be noted here that the mutual connection via the bridge section 43 may be made between the driving segments 42 instead of between the sensing segments 41.

<2.2 Advantages>

The present embodiment provides the same advantages as those offered by the first embodiment, in the configuration where a diamond-shaped common-electrode pattern is utilized. Also, since the bridge section 43 is used to provide mutual connection between the sensing segments 41 or between the driving segments 42, there is no need for the wirings X1 through X6 to be formed in the first wiring area 33 or the second wiring area 34 in the first embodiment for formation of the driving electrodes DRL. This reduces the number of wiring in the CF substrate 28, making it possible to further reduce the increase in the frame area.

<3. Third Embodiment>
<3.1 Conventional Art>

Figure 15:
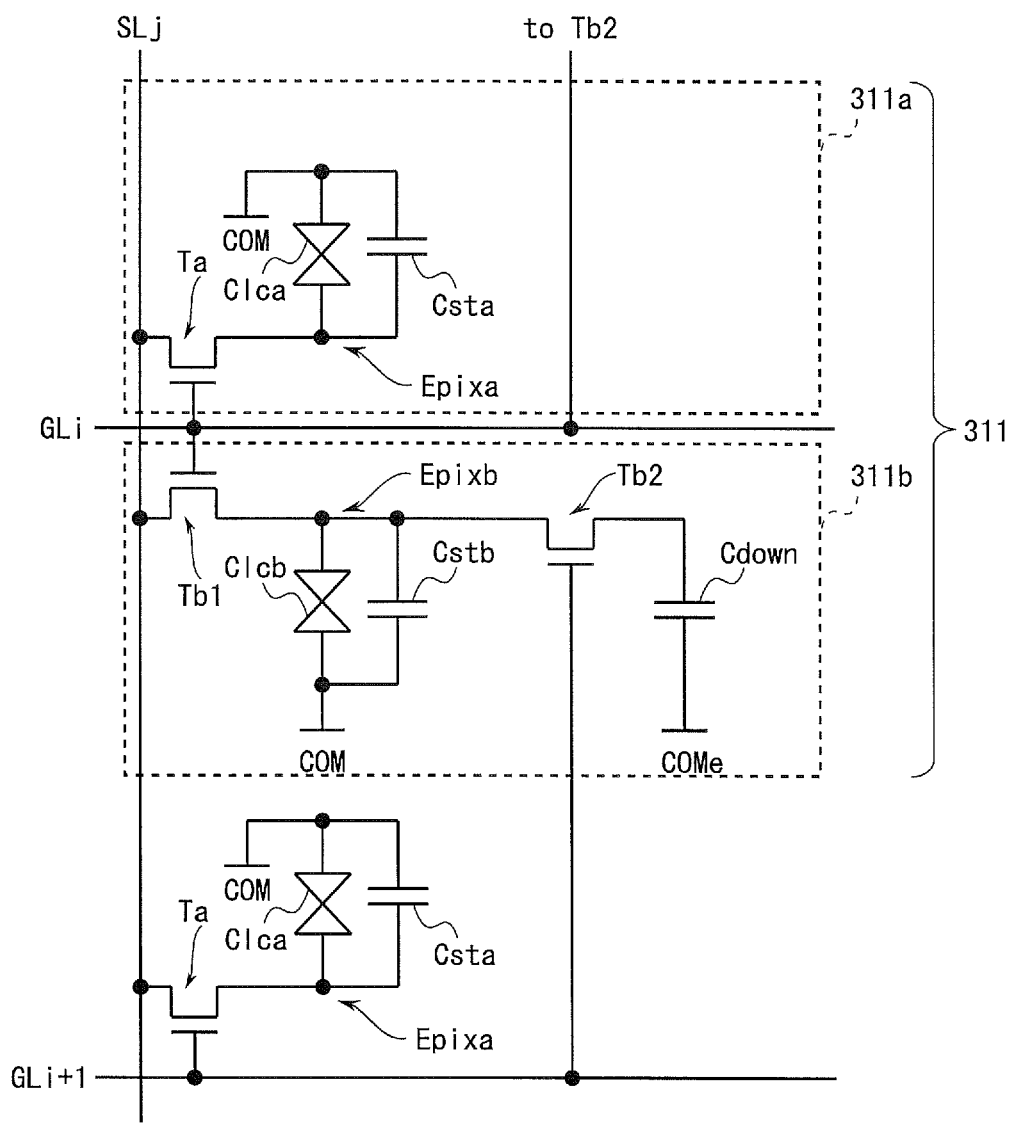
FIG. 15 is an equivalent-circuit diagram of a pixel in a conventional liquid crystal display device which utilizes a multiple pixel structure.

Before moving to a third embodiment of the present invention, description will be made for conventional art which is relevant to the third embodiment. FIG. 15 is an equivalent-circuit diagram which shows a pixel configuration in a conventional liquid crystal display device which utilizes a multiple pixel structure. The pixel structure shown in FIG. 15 is disclosed in Non-Patent Document 1 for example. The term "multiple pixel structure" refers to a pixel structure in which a pixel is divided into a plurality (typically, two) sub-pixels in order to eliminate visual-angle dependency of gamma characteristic in VA and other types of liquid crystal display panels. The term "a pixel" used here actually refers to "a sub-pixel" according to the first embodiment, and the term "sub-pixel" used here refers to what is obtained by dividing the "sub-pixel" according to the first embodiment. For the sake of expedience, however, description will be made on a premise that one pixel is divided into a plurality (two) of sub-pixels.

As shown in FIG. 15, a pixel 311 is disposed correspondingly to an intersection made by a source line SLj and a gate line GLi, and is constituted by a first sub-pixel 311a and the second sub-pixel 311b. The first sub-pixel 311a includes: a transistor Ta which has its gate terminal connected to the gate line GLi; a pixel electrode Epixa which is connected to the source line SLj via the transistor Ta; a common electrode COM; and a liquid crystal capacitance Clca and an auxiliary capacitance Csta which are formed between the pixel electrode Epixa and the common electrode COM. The second sub-pixel 311b is constituted by: a transistor Tb1 which has its gate terminal connected to the gate line GLi; a pixel electrode Epixb connected to the source line SLj via the transistor Tb1; a common electrode COM; a liquid crystal capacitance Clcb and an auxiliary capacitance Cstb which are formed between the pixel electrode Epixb and the common electrode COM; a transistor Tb2 which has its source terminal connected to the pixel electrode Epixb; and a variation capacitance Cdown which is formed between a drain terminal of the transistor Tb2 and the common electrode COM. The transistor Tb2 has its gate terminal connected to an immediately following gate line GLi+1.

Figure 16:
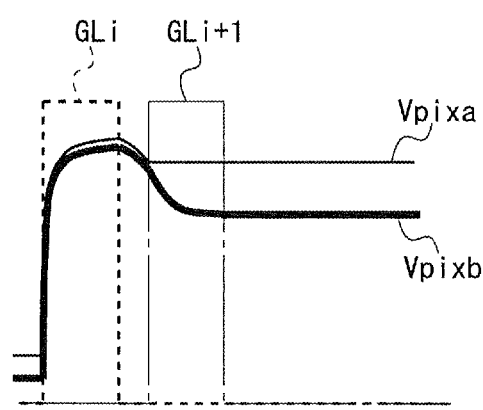
FIG. 16 is a signal waveform chart for describing pixel electric potential changes in the conventional display device and in a third embodiment of the present invention.

FIG. 16 is a signal waveform chart for describing pixel electric potential variation in a conventional liquid crystal display device which makes use of the multiple pixel structure. As shown in FIG. 16, when the gate line GLi is in a selected state, the transistors Ta, Tb1 are turned ON, and an electric potential which corresponds to a source signal is written to the pixel electrodes Epixa, Epixb. In this process, the pixel electrode Epixa receives a pixel electric potential Vpixa as its electric potential while the pixel electrode Epixb receives a pixel electric potential Vpixb as its electric potential, and these two electric potentials are substantially equal to each other. Thereafter, as the gate line GLi comes to a de-selected state, the transistors Ta, Tb1 are turned OFF. At this stage, there are slight drops in the pixel electric potentials Vpixa, Vpixb due to field-through voltages occurring in the pixel electric potentials Vpixa, Vpixb caused by an electric potential variation in the gate line GLi. It should be noted here that the transistor Tb2 is in the OFF state from the time when the gate line GLi is selected to the time when it is de-selected.

Then, as the gate line GLi+1 comes to a selected state, the transistor Tb2 is turned ON. Therefore, part of the electric charges held by the liquid crystal capacitance Clcb and the auxiliary capacitance Cstb are discharged, and is stored in the variation capacitance Cdown via the transistor Tb2. Due to this discharge, as shown in FIG. 16, the pixel electric potential Vpixb becomes slightly lower than the pixel electric potential Vpixa. Then, when the gate line GLi+1 is de-selected, the transistor Tb2 is turned OFF, and the pixel electric potential Vpixb is held until the next frame. Through the process described above, the first sub-pixel 11a and the second sub-pixel 11b obtain liquid crystal application voltages which are different from each other. As a result, in a normally-black mode for example, the first sub-pixel 311a implements a relatively bright pixel whereas the second sub-pixel 311b implements a relatively dark pixel. By creating a brightness difference between sub-pixels as described, gamma characteristics which differ from each other are observed, resulting in improvement in viewing angle dependency of the gamma characteristics. Also, the present multiple pixel structure does not require any additional source lines, etc. for the creation of the brightness difference between the sub-pixels, so the structure makes it possible to reduce increase in the number of source lines and power consumption for driving these lines.

However, such a conventional multiple pixel structure described above makes use of the auxiliary capacitances Csta, Cstb, and if the structure is to be used in a non-IPS type display panel, it becomes necessary for both of the CF substrate and the TFT substrate to be formed with common electrodes COM. This decreases aperture ratio. Especially in a non-IPS type touch-sensor-embedded liquid crystal display panel, not only the CF substrate side but also the TFT substrate side must be provided with additional wiring for independent drive of the common electrode COM, and this increases the frame area. Other problems include that the auxiliary capacitances Csta, Cstb increase the load when driving the common electrodes COM. Hence, the third embodiment of the present invention adopts a multiple pixel structure in the arrangement of the first embodiment.

<3.2 Pixel Configuration>

Figure 17:
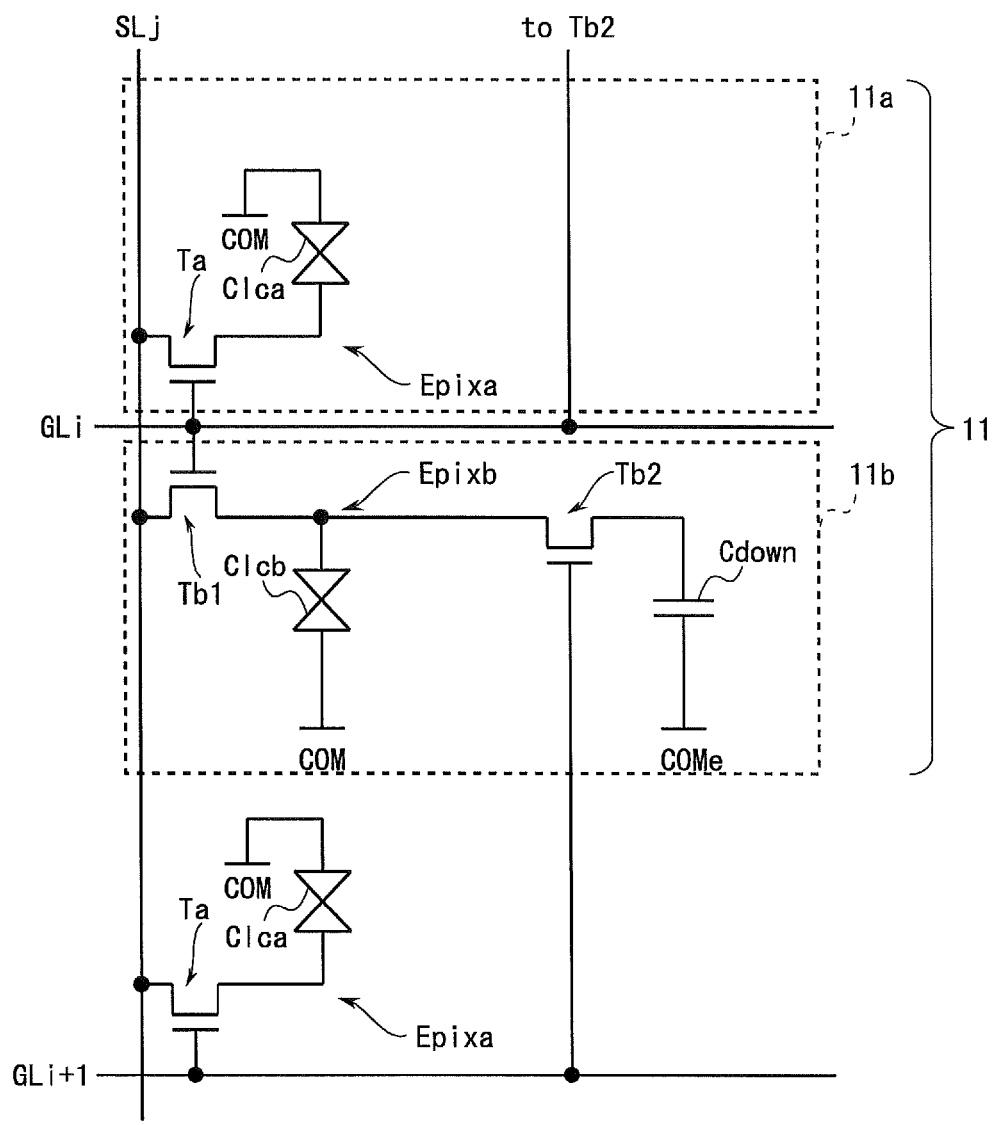
FIG. 17 is an equivalent-circuit diagram of a pixel in the third embodiment.
Figure 18:
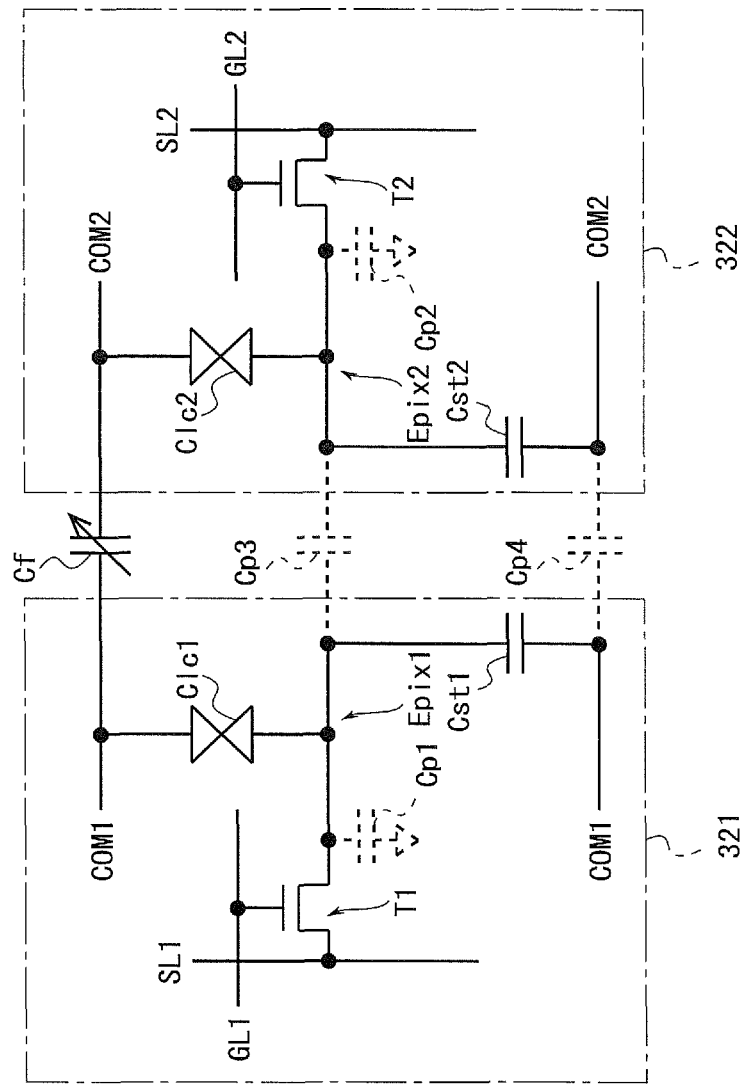
FIG. 18 is an equivalent-circuit diagram of a driving pixel and a sensing pixel in a conventional touch-sensor-embedded liquid crystal display panel.

FIG. 17 is an equivalent-circuit diagram which shows a pixel configuration in the third embodiment of the present invention. The present embodiment basically shares the configuration and other arrangements with the first embodiment except for the pixel configuration, so description will not be repeated for those common aspects. In the present embodiment, a driving pixel and a sensing pixel have a configuration shown as a pixel 11 in FIG. 17. The pixel 11 is the pixel 311 in the conventional multiple pixel structure but does not have the auxiliary capacitances Csta, Cstb. Specifically, the pixel 11 has the following configuration: The pixel 11 is disposed correspondingly to an intersection made by a source line SLj and a gate line GLi, and is constituted by: a first sub-pixel 11a as a first sub-pixel formation portion; and a second sub-pixel 11b as a second sub-pixel formation portion.

The first sub-pixel 11a is constituted by: a thin film transistor Ta which has its gate terminal connected to the gate line GLi; a pixel electrode Epixa which is connected to the source line SLj via the thin film transistor Ta; a common electrode COM; and a liquid crystal capacitance Clca which is formed between the pixel electrode Epixa and the common electrode COM.

The second sub-pixel 11b is constituted by: a thin film transistor Tb1 which has its gate terminal connected to the gate line GLi and works as a pixel switching element; a pixel electrode Epixb which is connected to the source line SLj via the thin film transistor Tb1; a common electrode COM; a liquid crystal capacitance Clcb which is formed between the pixel electrode Epixb and the common electrode COM; a thin film transistor Tb2 which has its source terminal connected to the pixel electrode Epixb and works as a variation switching element; and a variation capacitance Cdown which is formed between a drain terminal of the thin film transistor Tb2 and a common electrode COMe. The variation capacitance Cdown is for creating a brightness difference between the sub-pixels as described earlier, so it is not included in the "capacitance for holding a voltage representing the source signal applied to the source line SLj". The thin film transistor Tb2 has its gate terminal connected to an immediately following gate line GLi+1. Unlike the common electrode COM, the common electrode COMe is formed on the TFT substrate 25 for example, and is given a fixed electric potential during display operation. The common electrode COMe can be given an electric potential which is common to the driving pixel and the sensing pixel during the touch detection operation, and therefore, the present embodiment does not require the wiring on the TFT substrate 25 side for driving the driving region and the sensing region independently. It should be noted here that the common electrode COMe may be formed between other predetermined electrodes (such as the gate line GLi) than the common electrode COMe which is given a fixed electric potential during the display operation.

The present embodiment does not have the auxiliary capacitance Csta, Cstb, which are used in the conventional multiple pixel structure shown in FIG. 15. Specifically, the first sub-pixel 11a and the second sub-pixel 11b includes only the liquid crystal capacitance Clca and the liquid crystal capacitance Clcb respectively, each as a capacitance for holding a voltage which corresponds to a source signal applied to the source line SLj. Therefore, the TFT substrate side is not formed with the common electrode COM (except for the common electrode COMe) or wiring for connection thereto. This is already detailed in the description of the first embodiment, and will not be repeated here.

According to the present embodiment, the thin film transistors Ta, Tb1, Tb2 have their channel layers formed of IGZO as do the thin film transistors T1, T2 in the first embodiment. Thin film transistors which make use of an oxide semiconductor such as IGZO in their channel layers have larger ON-current than silicon thin film transistors. Therefore, if IGZO is used in the channel layer of the thin film transistor Tb2, there is a relatively larger charge amount moving from the liquid crystal capacitance Clcb to the variation capacitance Cdown via the thin film the transistor Tb2 when the thin film transistor Tb2 is turned ON. Consequently, it is possible to ensure a sufficient liquid crystal application voltage difference between the first sub-pixel 11a and the second sub-pixel 11b.

Pixel electric potential change in the present embodiment is the same as in the liquid crystal display device which utilizes a conventional multiple pixel structure shown in FIG. 16. Although the present embodiment is not provided with the auxiliary capacitances Csta, Cstb, the pixel electric potentials Vpixa, Vpixb is kept sufficiently during the off period since the thin film transistors Ta, Tb1, Tb2 have their channel layers made of IGZO.

<3.3 Advantages>

The present embodiment eliminates visual-angle dependency of gamma characteristic by the use of a multiple pixel structure, while providing the same advantages as offered by the first embodiment. Also, by using IGZO in the channel layer of the thin film the transistor Tb2, the arrangement makes it possible to ensure a sufficient liquid crystal application voltage difference between the first sub-pixel 11a and the second sub-pixel 11b. The present embodiment may also be combined with the second embodiment.

<4. Others>

In each of the embodiments thus far, a VA type was described as an example of a non-IPS type liquid crystal display panel. However, the present invention is also applicable to other types of liquid crystal display panels such as TN (Twisted Nematic) type. Also, in each of the embodiments covered thus far, description was made on a premise that oxide semiconductor such as IGZO is used in the channel layers of the thin film transistors. However, the present invention is not limited to this. The advantages of the present invention can also be obtained by using silicon thin film transistors although this will increase variation in the liquid crystal application voltage during the OFF period. Also in other aspects, any of the embodiments described so far can be varied in many ways within a scope of the present invention.

According to the arrangements described thus far, the present invention provides a touch-sensor-embedded display panel with reduced decrease in aperture ratio and reduced increase in frame area, with lowered power consumption and improved operation performance; a display device provided therewith; and a method for driving the touch-sensor-embedded display panel.

INDUSTRIAL APPLICABILITY

The present invention is applicable to a display panel which incorporates a capacitive touch sensor; to a display device provided therewith; and to a method for driving the display panel.

LEGEND 11, 51 through 54: Pixels (Pixel formation portions)
11a, 11b: First & Second sub-pixels (First & Second sub-pixel formation portions)
21: Driving pixel
22: Sensing pixel
25: TFT substrate (First substrate)
27: Common electrode group
28: CF substrate (Second substrate)
33, 34: First & Second wiring areas
41, 91s: Sensing segments
42, 92s through 94s: Driving segments
43: Bridge section (wiring)
61r, 61g, 61b: R, G, B sub-pixels
71, T1, T2, Ta, Tb1, Tb2: Transistors & thin film transistors (Switching elements)
72, Epix1, Epix2, Epixa, Epixb: Pixel electrodes
91: Sensing region (second group)
92 through 94: Driving regions (first group)
110: Host CPU
120: Display control unit
121: Display control circuit
122: LCD driver
130: Touch detection control unit
131: Touch detection control circuit
132: Drive circuit
133: Sensing circuit
200: Touch-sensor-embedded liquid crystal display panel
COM, COMa through COMe: Common electrodes
COM1, COM2: Driving common electrode & Sensing common electrode
Clc1, Clc2, Clca, Clcb: Liquid crystal capacitances (Pixel capacitances)
Cdown: Variation capacitance
SL, SL1, SL2, SLj: Source lines (image signal lines)
GL, GL1, GL2, GLi, GLi+1: Gate lines (scanning signal lines)
DRL: Driving line
SEL: Sensing line
X1 through X6: Driving regions (first group), wiring
Y1 through Y8: Sensing regions (second group), wiring

The invention claimed is:

1. A touch-sensor-embedded display panel comprising a plurality of pixel formation portions disposed correspondingly to a plurality of image signal lines and to a plurality of scanning signal lines formed on a first substrate, wherein
each pixel formation portion comprises:
a pixel switching element disposed on the first substrate and having a control terminal connected to a corresponding one of the scanning signal lines;
a pixel electrode disposed on the first substrate and connected to a corresponding one of the image signal lines via the pixel switching element;
common electrodes belonging to a first group or a second group and disposed on a second substrate opposed to the first substrate;
and a pixel capacitance defined between the pixel electrode and the common electrode as an only capacitance for holding a voltage which corresponds to a signal applied to the image signal lines; wherein
the common electrodes belonging to the first group provide a plurality of driving lines which are driven by driving signals during a touch detection operation whereas
the common electrodes belonging to the second group provide a plurality of sensing lines crossing the driving lines, for receiving a signal responsive to the driving signal during the touch detection operation,
the pixel switching element is provided by a thin film transistor which includes a channel layer made of an oxide semiconductor,
each pixel formation portion includes:
a first sub-pixel formation portion which includes the pixel switching element, the pixel electrode the common electrode and the pixel capacitance; and
a second sub-pixel formation portion which includes the pixel switching element, the pixel electrode, the common electrode, the pixel capacitance a variation switching element having a control terminal connected to a scanning signal line which immediately follows the scanning signal line that corresponds to the pixel; and a variation capacitance;
the variation switching element is between the pixel electrode and one end of the variation capacitance, and the variation capacitance has the other end being connected to an electrode which is provided with a predetermined fixed electric potential at least during the display operation.

2. The touch-sensor-embedded display panel according to claim 1, wherein the variation switching element is provided by a thin film transistor which has a channel layer formed of an oxide semiconductor.

3. The touch-sensor-embedded display panel according to claim 2, wherein the oxide semiconductor contains indium, gallium, zinc and oxygen as primary ingredients.

* * * * *